(12) United States Patent
Collini et al.

(10) Patent No.: US 12,518,252 B2
(45) Date of Patent: Jan. 6, 2026

(54) METHOD FOR DETERMINING A MAINTENANCE PLAN OF A GROUP OF AIRCRAFT AND THE SYSTEM IMPLEMENTING THE METHOD

(71) Applicant: LEONARDO S.P.A., Rome (IT)

(72) Inventors: Alessandro Collini, Turin (IT); Andrea Piccoli, Turin (IT)

(73) Assignee: LEONARDO S.P.A., Rome (IT)

( * ) Notice: Subject to any disclaimer, the term of this patent is extended or adjusted under 35 U.S.C. 154(b) by 128 days.

(21) Appl. No.: 18/564,865

(22) PCT Filed: Jun. 3, 2022

(86) PCT No.: PCT/IB2022/055201
§ 371 (c)(1),
(2) Date: Nov. 28, 2023

(87) PCT Pub. No.: WO2022/254399
PCT Pub. Date: Dec. 8, 2022

(65) Prior Publication Data
US 2024/0265351 A1    Aug. 8, 2024

(30) Foreign Application Priority Data
Jun. 4, 2021 (IT) .......................... 102021000014582

(51) Int. Cl.
*G06Q 10/20* (2023.01)
*B64F 5/40* (2017.01)

(52) U.S. Cl.
CPC .............. *G06Q 10/20* (2013.01); *B64F 5/40* (2017.01)

(58) Field of Classification Search
CPC .................................. G06Q 10/20; B64F 5/40
See application file for complete search history.

(56) References Cited

U.S. PATENT DOCUMENTS

| | | | | |
|---|---|---|---|---|
| 6,226,597 B1* | 5/2001 | Eastman | ................ | G06Q 10/06 702/34 |
| 8,452,475 B1* | 5/2013 | West | ...................... | G07C 5/006 701/31.6 |
| 2007/0118301 A1* | 5/2007 | Andarawis | .............. | G01M 5/00 702/33 |

OTHER PUBLICATIONS

International Search Report and Written Opinion in corresponding International Patent Application No. PCT/IB2022/055201, mailed Sep. 14, 2022 (16 pages).

(Continued)

*Primary Examiner* — Hunter B Lonsberry
(74) *Attorney, Agent, or Firm* — Leason Ellis LLP

(57) ABSTRACT

Method implemented through a computer for determining a maintenance plan of a group of aircraft, comprising receiving a data structure with a plurality of groups of values associated with a plurality of flights of the aircraft, wherein each flight has a duration, each group of values relates to a physical quantity associated with the use of an aircraft, and wherein each group of values is acquired during a flight by a detection system coupled to an aircraft. The method further comprises identifying one or more representative flights from the plurality of flights, starting from the data structure and using at least one statistical test, wherein the groups of values associated with the representative flights are, from a statistical viewpoint, values of typical use of the group of aircraft; determining a load sequence comprising the groups of values associated with the representative flights repeated a number of times, as a function of the duration of the respective representative flight; and determining a state of use of the group of aircraft, starting from the load sequence.

13 Claims, 17 Drawing Sheets

(56) References Cited

OTHER PUBLICATIONS

International Preliminary Report on Patentability in corresponding International Patent Application No. PCT/IB2022/055201, mailed Sep. 6, 2023 (14 pages).

* cited by examiner

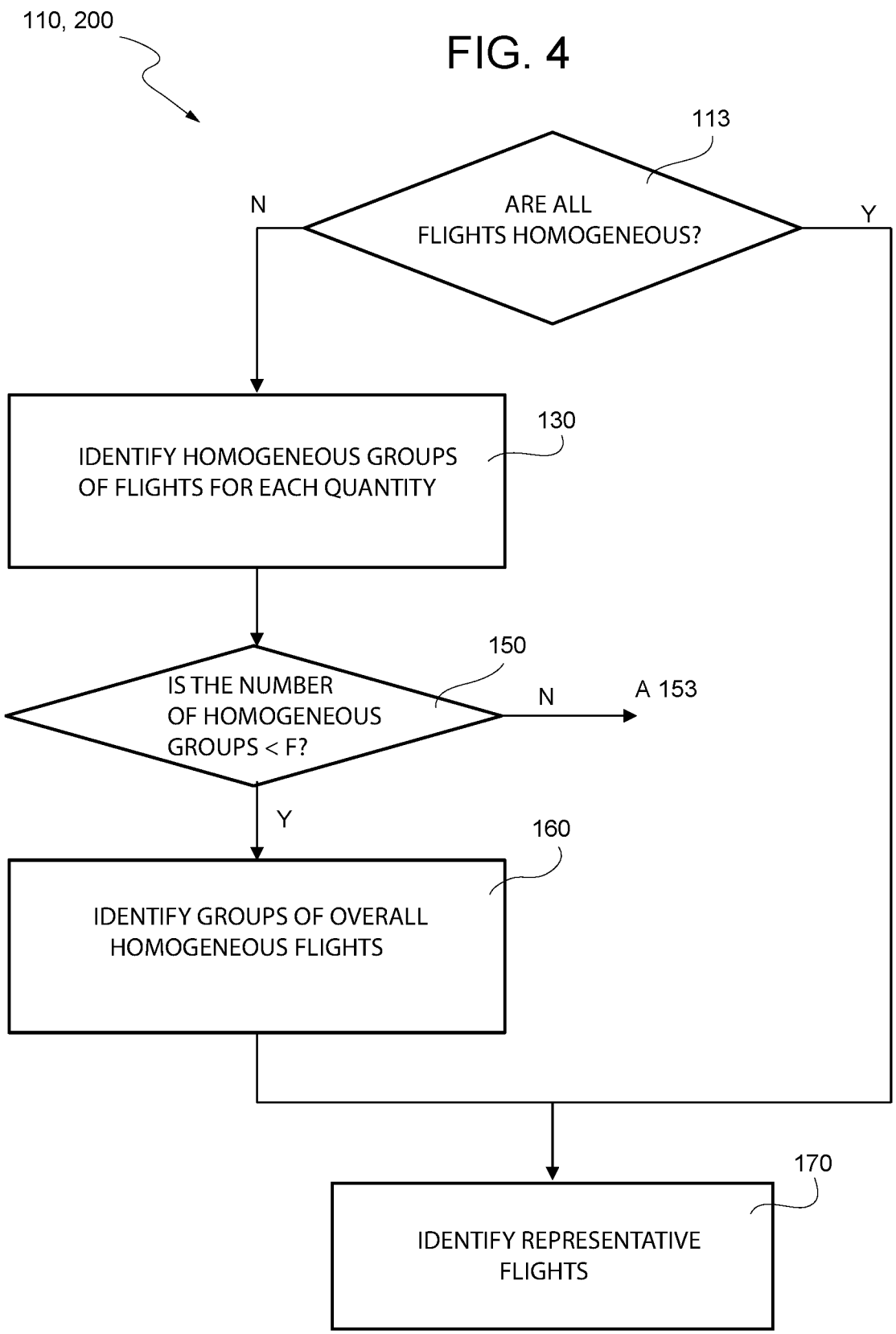

X1 →

| Nz | Flight 1 | Flight 2 | Flight 3 | Flight 4 | Flight 5 | Flight 6 | Flight 7 | Flight 8 | Flight 9 |
|---|---|---|---|---|---|---|---|---|---|
| -4 | 0 | 0 | 0 | 0 | 0 | 0 | 0 | 0 | 0 |
| -3,5 | 0 | 0 | 0 | 0 | 0 | 0 | 0 | 0 | 0 |
| -3 | 0 | 0 | 0 | 0 | 0 | 0 | 0 | 0 | 0 |
| -2,5 | 0 | 0 | 0 | 0 | 0 | 0 | 0 | 0 | 0 |
| -2 | 0 | 7 | 0 | 0 | 0 | 0 | 0 | 0 | 0 |
| -1,5 | 0 | 13 | 0 | 0 | 0 | 0 | 0 | 0 | 0 |
| -1 | 0 | 16 | 0 | 0 | 0 | 0 | 0 | 0 | 0 |
| -0,5 | 0 | 59 | 0 | 0 | 0 | 0 | 0 | 0 | 0 |
| 0,5 | 12 | 75 | 12 | 21 | 21 | 20 | 21 | 21 | 20 |
| 1 | 11 | 59 | 9 | 17 | 17 | 16 | 17 | 17 | 16 |
| 1,5 | 7 | 37 | 7 | 11 | 11 | 11 | 11 | 11 | 11 |
| 2 | 3 | 27 | 3 | 8 | 8 | 8 | 8 | 8 | 8 |
| 2,5 | 1 | 21 | 1 | 7 | 7 | 7 | 7 | 7 | 5 |
| 3 | 1 | 17 | 1 | 5 | 5 | 5 | 5 | 5 | 5 |
| 3,5 | 0 | 13 | 0 | 4 | 4 | 4 | 4 | 4 | 4 |
| 4 | 0 | 9 | 0 | 3 | 3 | 3 | 3 | 3 | 3 |
| 4,5 | 0 | 5 | 0 | 1 | 1 | 1 | 1 | 1 | 1 |
| 5 | 0 | 3 | 0 | 1 | 1 | 1 | 1 | 1 | 1 |
| 5,5 | 0 | 1 | 0 | 0 | 0 | 0 | 0 | 0 | 0 |
| 6 | 0 | 0 | 0 | 0 | 0 | 0 | 0 | 0 | 0 |
| 6,5 | 0 | 0 | 0 | 0 | 0 | 0 | 0 | 0 | 0 |
| 7 | 0 | 0 | 0 | 0 | 0 | 0 | 0 | 0 | 0 |
| 7,5 | 0 | 0 | 0 | 0 | 0 | 0 | 0 | 0 | 0 |
| 8 | 0 | 0 | 0 | 0 | 0 | 0 | 0 | 0 | 0 |
| 8,5 | 0 | 0 | 0 | 0 | 0 | 0 | 0 | 0 | 0 |
| 9 | 0 | 0 | 0 | 0 | 0 | 0 | 0 | 0 | 0 |

$i = 13$ (row 2,5); $j = 4$ (Flight 4); F header;

| Flight 1 | Flight 2 | Flight 3 | Flight 4 | Flight 5 | Flight 6 | Flight 7 | Flight 8 | Flight 9 |
|---|---|---|---|---|---|---|---|---|
| 1 | 21 | 1 | 7 | 7 | 7 | 7 | 7 | 5 |

| Flight 1 | Flight 3 | Flight 9 | Flight 4 | Flight 5 | Flight 6 | Flight 7 | Flight 8 | Flight 2 |
|---|---|---|---|---|---|---|---|---|
| 1 | 1 | 5 | 7 | 7 | 7 | 7 | 7 | 21 |
| 1,5 | 1,5 | 3 | 6 | 6 | 6 | 6 | 6 | 9 |

| Nz | Flight 1 | Flight 2 | Flight 3 | Flight 4 | Flight 5 | Flight 6 | Flight 7 | Flight 8 | Flight 9 |
|---|---|---|---|---|---|---|---|---|---|
| -4 | 5 | 5 | 5 | 5 | 5 | 5 | 5 | 5 | 5 |
| -3,5 | 5 | 5 | 5 | 5 | 5 | 5 | 5 | 5 | 5 |
| -3 | 5 | 5 | 5 | 5 | 5 | 5 | 5 | 5 | 5 |
| -2,5 | 5 | 5 | 5 | 5 | 5 | 5 | 5 | 5 | 5 |
| -2 | 4,5 | 9 | 4,5 | 4,5 | 4,5 | 4,5 | 4,5 | 4,5 | 4,5 |
| -1,5 | 4,5 | 9 | 4,5 | 4,5 | 4,5 | 4,5 | 4,5 | 4,5 | 4,5 |
| -1 | 4,5 | 9 | 4,5 | 4,5 | 4,5 | 4,5 | 4,5 | 4,5 | 4,5 |
| -0,5 | 4,5 | 9 | 4,5 | 4,5 | 4,5 | 4,5 | 4,5 | 4,5 | 4,5 |
| 0,5 | 1,5 | 9 | 1,5 | 6,5 | 6,5 | 3,5 | 6,5 | 6,5 | 3,5 |
| 1 | 2 | 9 | 1 | 6,5 | 6,5 | 3,5 | 6,5 | 6,5 | 3,5 |
| 1,5 | 1,5 | 9 | 1,5 | 5,5 | 5,5 | 5,5 | 5,5 | 5,5 | 5,5 |
| 2 | 1,5 | 9 | 1,5 | 5,5 | 5,5 | 5,5 | 5,5 | 5,5 | 5,5 |
| 2,5 | 1,5 | 9 | 1,5 | 6 | 6 | 6 | 6 | 6 | 3 |
| 3 | 1,5 | 9 | 1,5 | 5,5 | 5,5 | 5,5 | 5,5 | 5,5 | 5,5 |
| 3,5 | 1,5 | 9 | 1,5 | 5,5 | 5,5 | 5,5 | 5,5 | 5,5 | 5,5 |
| 4 | 1,5 | 9 | 1,5 | 5,5 | 5,5 | 5,5 | 5,5 | 5,5 | 5,5 |
| 4,5 | 1,5 | 9 | 1,5 | 5,5 | 5,5 | 5,5 | 5,5 | 5,5 | 5,5 |
| 5 | 1,5 | 9 | 1,5 | 5,5 | 5,5 | 5,5 | 5,5 | 5,5 | 5,5 |
| 5,5 | 4,5 | 9 | 4,5 | 4,5 | 4,5 | 4,5 | 4,5 | 4,5 | 4,5 |
| 6 | 5 | 5 | 5 | 5 | 5 | 5 | 5 | 5 | 5 |
| 6,5 | 5 | 5 | 5 | 5 | 5 | 5 | 5 | 5 | 5 |
| 7 | 5 | 5 | 5 | 5 | 5 | 5 | 5 | 5 | 5 |
| 7,5 | 5 | 5 | 5 | 5 | 5 | 5 | 5 | 5 | 5 |
| 8 | 5 | 5 | 5 | 5 | 5 | 5 | 5 | 5 | 5 |
| 8,5 | 5 | 5 | 5 | 5 | 5 | 5 | 5 | 5 | 5 |
| 9 | 5 | 5 | 5 | 5 | 5 | 5 | 5 | 5 | 5 | i = 13 (pointing to row Nz = 2,5)

|        | Flight1 | Flight2 | Flight3 | Flight4 | Flight5 | Flight6 | Flight7 | Flight8 | Flight9 |
|--------|---------|---------|---------|---------|---------|---------|---------|---------|---------|
| Flight 1 | -     | N.O.    | O.      | N.O.    | N.O.    | N.O.    | N.O.    | N.O.    | N.O.    |
| Flight 2 | N.O.  | -       | N.O.    | N.O.    | N.O.    | N.O.    | N.O.    | N.O.    | N.O.    |
| Flight 3 | O.    | N.O.    | -       | N.O.    | N.O.    | N.O.    | N.O.    | N.O.    | N.O.    |
| Flight 4 | N.O.  | N.O.    | N.O.    | -       | O.      | O.      | O.      | O.      | O.      |
| Flight 5 | N.O.  | N.O.    | N.O.    | O.      | -       | O.      | O.      | O.      | O.      |
| Flight 6 | N.O.  | N.O.    | N.O.    | O.      | O.      | -       | O.      | O.      | O.      |
| Flight 7 | N.O.  | N.O.    | N.O.    | O.      | O.      | O.      | -       | O.      | O.      |
| Flight 8 | N.O.  | N.O.    | N.O.    | O.      | O.      | O.      | O.      | -       | O.      |
| Flight 9 | N.O.  | N.O.    | N.O.    | O.      | O.      | O.      | O.      | O.      | -       |

FIG. 14

|        | Flight1 | Flight2 | Flight3 | Flight4 | Flight5 | Flight6 | Flight7 | Flight8 | Flight9 |
|--------|---------|---------|---------|---------|---------|---------|---------|---------|---------|
| G1(Nz) | 1 | 0 | 1 | 0 | 0 | 0 | 0 | 0 | 0 |
| G2(Nz) | 0 | 0 | 0 | 0 | 0 | 0 | 0 | 0 | 0 |
| G3(Nz) | 0 | 1 | 0 | 1 | 1 | 1 | 1 | 1 | 1 |
| G1(p)  | 1 | 1 | 0 | 0 | 0 | 0 | 0 | 0 | 0 |
| G2(p)  | 0 | 0 | 1 | 0 | 1 | 0 | 1 | 1 | 0 |
| G3(p)  | 0 | 0 | 0 | 1 | 0 | 1 | 0 | 0 | 1 |

Xf

| Nz | $F_{1,1}$ | $F_{2,1}$ |
|---|---|---|
| -4 | 0 | 0 |
| -3,5 | 0 | 0 |
| -3 | 0 | 0 |
| -2,5 | 0 | 0 |
| -2 | 0 | 0 |
| -1,5 | 0 | 0 |
| -1 | 0 | 0 |
| -0,5 | 0 | 0 |
| 0,5 | 21 | 13 |
| 1 | 17 | 11 |
| 1,5 | 11 | 4 |
| 2 | 8 | 5 |
| 2,5 | 7 | 3 |
| 3 | 5 | 3 |
| 3,5 | 4 | 0 |
| 4 | 3 | 0 |
| 4,5 | 1 | 0 |
| 5 | 1 | 0 |
| 5,5 | 0 | 0 |
| 6 | 0 | 0 |
| 6,5 | 0 | 0 |
| 7 | 0 | 0 |
| 7,5 | 0 | 0 |
| 8 | 0 | 0 |
| 8,5 | 0 | 0 |
| 9 | 0 | 0 |

FIG. 17

| Nz | Flight 1 | Flight 2 | Flight 3 | max | flight associated with max |
|---|---|---|---|---|---|
| -4 | 0 | 0 | 0 | 0 | n.n |
| -3,5 | 0 | 0 | 0 | 0 | n.n |
| -3 | 0 | 0 | 0 | 0 | n.n |
| -2,5 | 0 | 0 | 0 | 0 | n.n |
| -2 | -2 | 5 | -2 | 5 | Flight 2 |
| -1,5 | -4 | 9 | -4 | 9 | Flight 2 |
| -1 | -5 | 11 | -5 | 11 | Flight 2 |
| -0,5 | -20 | 39 | -20 | 39 | Flight 2 |
| 0,5 | 44 | 5 | -49 | 44 | Flight 1 |
| 1 | 51 | -4 | -46 | 51 | Flight 1 |
| 1,5 | 57 | -16 | -42 | 57 | Flight 1 |
| 2 | 28 | -5 | -24 | 28 | Flight 1 |
| 2,5 | 11 | 2 | -12 | 11 | Flight 1 |
| 3 | 6 | 3 | -9 | 6 | Flight 1 |
| 3,5 | -6 | 7 | -2 | 7 | Flight 2 |
| 4 | -4 | 5 | -1 | 5 | Flight 2 |
| 4,5 | -2 | 3 | -1 | 3 | Flight 2 |
| 5 | -1 | 2 | 0 | 2 | Flight 2 |
| 5,5 | 0 | 1 | 0 | 1 | Flight 2 |
| 6 | 0 | 0 | 0 | 0 | n.n |
| 6,5 | 0 | 0 | 0 | 0 | n.n |
| 7 | 0 | 0 | 0 | 0 | n.n |
| 7,5 | 0 | 0 | 0 | 0 | n.n |
| 8 | 0 | 0 | 0 | 0 | n.n |
| 8,5 | 0 | 0 | 0 | 0 | n.n |
| 9 | 0 | 0 | 0 | 0 | n.n |

FIG. 20

METHOD FOR DETERMINING A MAINTENANCE PLAN OF A GROUP OF AIRCRAFT AND THE SYSTEM IMPLEMENTING THE METHOD

CROSS-REFERENCE TO RELATED APPLICATIONS

This patent application is a U.S. National Phase Application under 35 U.S.C. § 371 of International Patent Application No. PCT/IB2022/055201, filed on Jun. 3, 2022, which claims priority and is related to Italian Patent Application No. 102021000014582, filed on Jun. 4, 2021, all of which are incorporated by reference, as if expressly set forth in their respective entireties.

TECHNICAL FIELD OF THE INVENTION

The present invention relates to a method for determining a maintenance plan of a group of aircraft and a system implementing the method.

STATE OF THE ART

As is known, in the aeronautical field there is a particular need to periodically monitor the state of fatigue, and more generally the state of health, of the aircraft and the components thereof, in order to be able to accurately estimate the residual life time of each component, without compromising flight safety.

Furthermore, for damage-tolerant aircraft, inspection intervals are calculated starting from a theoretical spectrum of use and it may be necessary to re-evaluate these intervals according to the actual use in service.

In particular, starting with the knowledge of an initial structural defect of an aircraft and using a possible theoretical load history of the aircraft, it is known to perform simulation algorithms of propagation of the initial structural defect. This makes it possible to establish a cadenced inspection and maintenance plan for the aircraft.

However, the Applicant noted that this known approach is imprecise and does not allow an efficient optimisation of the scheduling of aircraft maintenance/inspection interventions.

In fact, the possible theoretical load history used by such simulation algorithms is based on theoretical values of the loads and stresses to which the aircraft may theoretically be subjected, in use, during flight. These theoretical values are determined in relation to the design requirements of the aircraft; however, they may not reflect the actual values of the loads and stresses to which the aircraft is subjected in use.

Moreover, this known approach requires complex data processing to determine the possible theoretical load history of the aircraft. This is particularly disadvantageous in cases where monitoring the state of health of a plurality of aircraft belonging to a fleet is required.

Aim of the present invention is to overcome the disadvantages of the prior art.

SUBJECT AND SUMMARY OF THE INVENTION

According to the present invention there is provided a method and a system for determining a maintenance plan of a group of aircraft, as defined in the appended claims.

BRIEF DESCRIPTION OF THE DRAWINGS

To better understand the present invention preferred embodiments thereof will be now described, for merely exemplary and non-limiting purposes, with reference to the appended drawings, wherein:

FIG. 4 shows in detail a flowchart of a step of the method of FIG. 2;

FIG. 6 shows an example of an exceedances matrix of an aircraft obtainable starting from the data structure of FIG. 3;

FIGS. 8 and 9 show a numerical example of application of the flowchart of FIG. 7, applied to the exceedances matrix of FIG. 6;

FIG. 11 shows a numerical example of application of the flowcharts of FIGS. 7 and 10 starting from the exceedances matrix of FIG. 6;

FIG. 13 shows an example of a result that can be obtained by applying the flowchart of FIG. 12, starting from the exceedances matrix of FIG. 6;

FIG. 14 shows a numerical example of application of another step of the flowchart of FIG. 4;

FIG. 17 shows a numerical example of a fleet exceedances matrix, obtained starting from a plurality of aircraft representative flights;

FIGS. 19 and 20 show a numerical example of application of the flowchart of FIG. 18;

DETAILED DESCRIPTION OF PREFERRED EMBODIMENTS OF THE INVENTION

Figure 1:
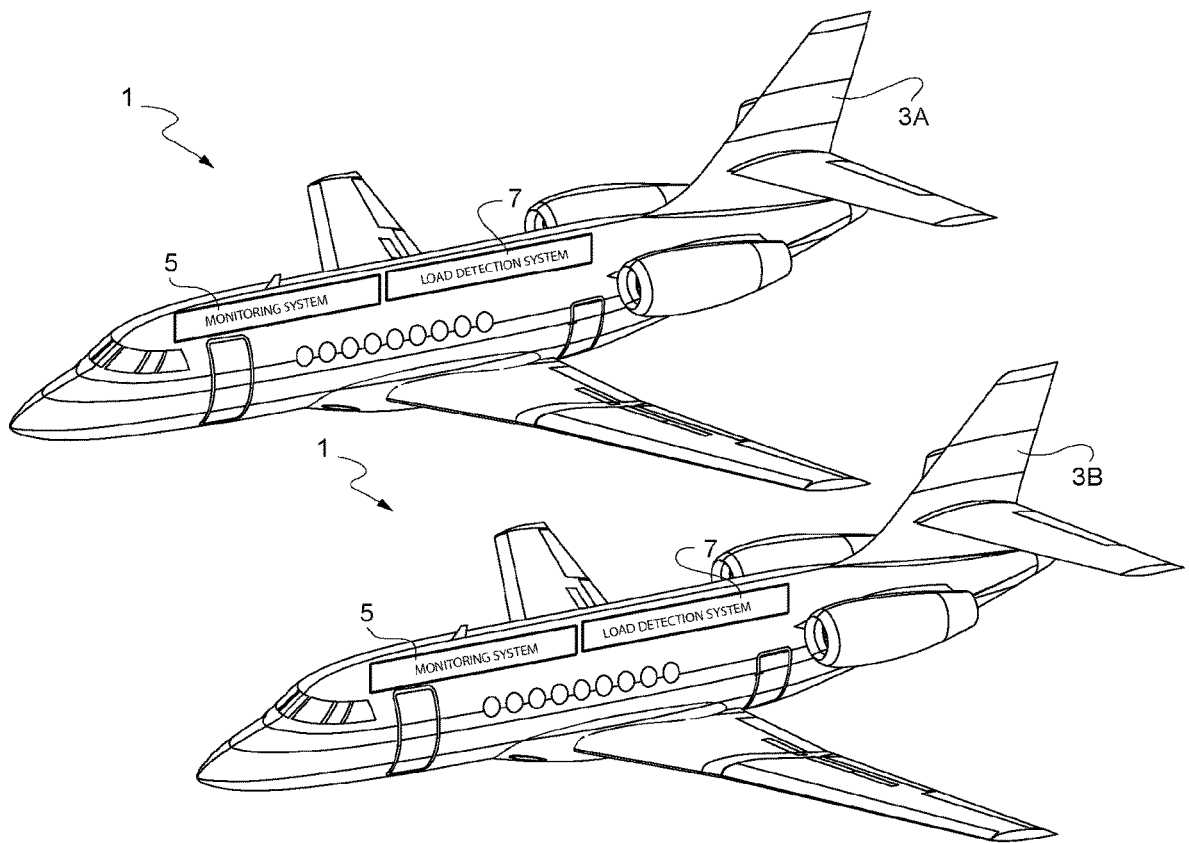
FIG. 1 schematically shows views of aircraft equipped with monitoring systems.

FIG. 1 shows a fleet 1 comprising a plurality of aircraft 3, here a first and a second aircraft 3A, 3B, wherein each aircraft 3 is equipped with a monitoring system 5 and a load detection system 7.

Thereafter, the aircraft 3 are generically identified by an index k. Furthermore, for the sake of simplicity, reference will hereafter be made to an aircraft 3, or even a generic k-th aircraft 3, to denote any one of the aircraft 3 of the fleet 1, unless otherwise specified.

The monitoring system 5 and the load detection system 7 comprise a plurality of sensors, for detecting one or more quantities relative to the use of the aircraft 3, during a flight of the aircraft 3.

The monitoring system 5 and the load detection system 7 acquire over time a plurality of samples of such quantities, each with a specific sampling frequency.

In practice, the monitoring system 5 and the load detection system 7 allow to determine a real usage spectrum of the aircraft 3.

In the following, these quantities are referred to as primary quantities Pr and are assumed to be in number equal to L.

The primary quantities Pr comprise aero-mechanical and load parameters.

For example, the primary quantities Pr can be variables related to the kinematics of the aircraft that is flying and on the ground, such as, for example pitch angle, roll angle, yaw angle, track angle, vertical acceleration, vertical speed, longitudinal acceleration, lateral acceleration roll speed and acceleration, pitch speed and acceleration, yaw speed and acceleration, stay in flight zones subjected to buffeting, deflections of moving surfaces, landing gear wheel braking levels, main gear steering levels; environmental variables, such as, for example, airspeed, radar altitude, barometric altitude, wind speed, wind direction, total air temperature, aircraft weight; and/or variables related to the energy systems, such as torque of the engines, rotation speed of the engine turbines, rotation speed of the engine generators.

The primary quantities Pr may further comprise one or more load values, such as, for example, bending and torsional moment at a wing root, hinge moment of one or more moving surfaces of the aircraft 3, bending and torsional load of specific fuselage stations, cabin pressurisation loads, etc.

Figure 2:
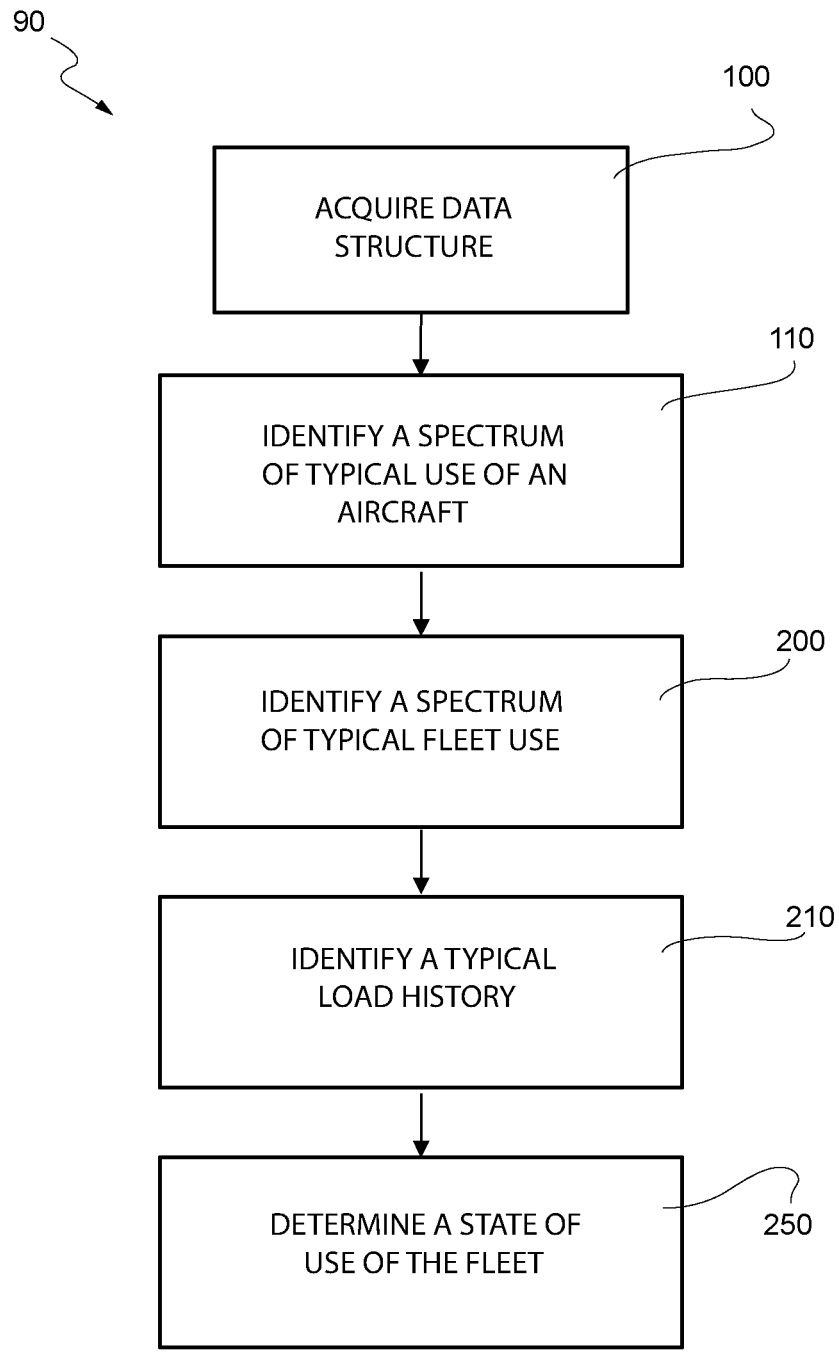
FIG. 2 shows a flowchart of the present method, according to an embodiment.

That being said, as shown in FIG. 2, the present method, herein indicated by 90, provides for the acquisition (step 100) of a data structure comprising, for each aircraft 3 of the fleet 1, respective values of the primary quantities Pr that have been acquired, in use, during a plurality of flights F.

For example, the data structure may comprise values acquired during a first flight number F1 for the first aircraft 3A and during a second flight number F2 for the second aircraft 3B.

Figure 3:
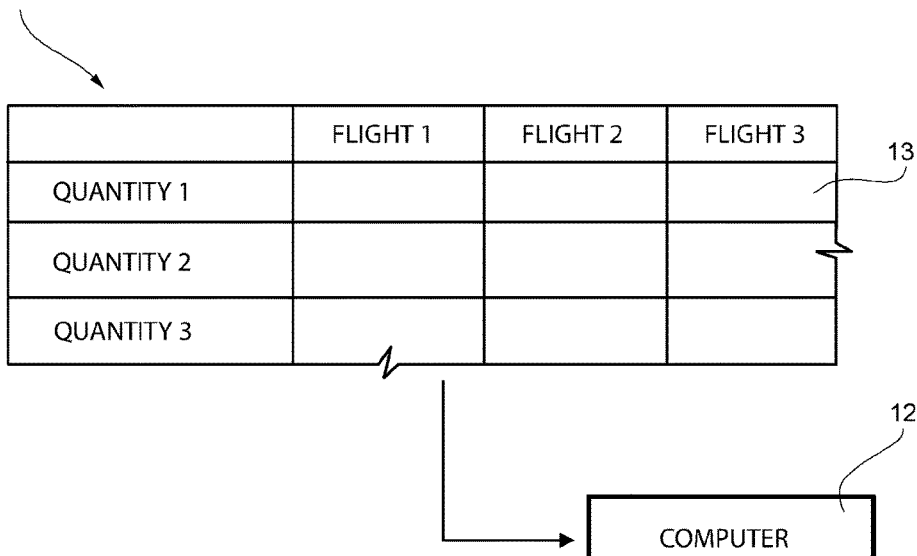
FIG. 3 shows a simplified diagram of a data structure comprising values of physical quantities acquired, in use, by the aircraft of FIG. 1.

FIG. 3 qualitatively shows an extract of a data structure 10, which comprises, for the k-th aircraft 3, a plurality of groups of data 13.

The groups of data 13, also referred to as actual usage spectra or simply spectra, each comprise the values or levels of a respective primary quantity Pr, which have been acquired by the monitoring system 5 and/or by the load detection system 7, in a specific flight of the plurality of flights F.

In particular, the data structure 10 stores a large number of samples of each primary quantity. That is, the data structure 10 stores samples of each primary quantity Pr that have been acquired during a large number of flights, or more generally during a large number of flight hours, e.g. greater than about one thousand hours for each aircraft 3.

However, in general, the number of flight hours may vary depending on the type of use of the aircraft 3 of the fleet 1. For example, if the aircraft 3 of the fleet 1 periodically change type of activity, then it may be preferable to use a higher number of flight hours. Conversely, if the aircraft 3 of the fleet 1 perform the same activities over time, then it may be sufficient to use fewer flight hours.

As still shown in the example of FIG. 3, the data structure 10 can be stored in a computer 12.

Again with reference to FIG. 2, the computer 12 processes (step 110) the data structure 10, in order to identify a spectrum of values of the primary quantities Pr, which describes a typical use of each aircraft 3 of the fleet 1.

In detail, step 110 comprises a plurality of steps (FIG. 4) aimed at identifying one or more flights of the plurality of flights F, hereinafter referred to as aircraft representative flights $F_{k,r}$, whose values of the primary quantities Pr characterise, from a statistical viewpoint, the typical use of the k-th aircraft 3.

The computer 12 first verifies whether all flights of the plurality of flights F that are associated with the k-th aircraft 3 are statistically homogeneous with each other (step 113).

Figure 5:
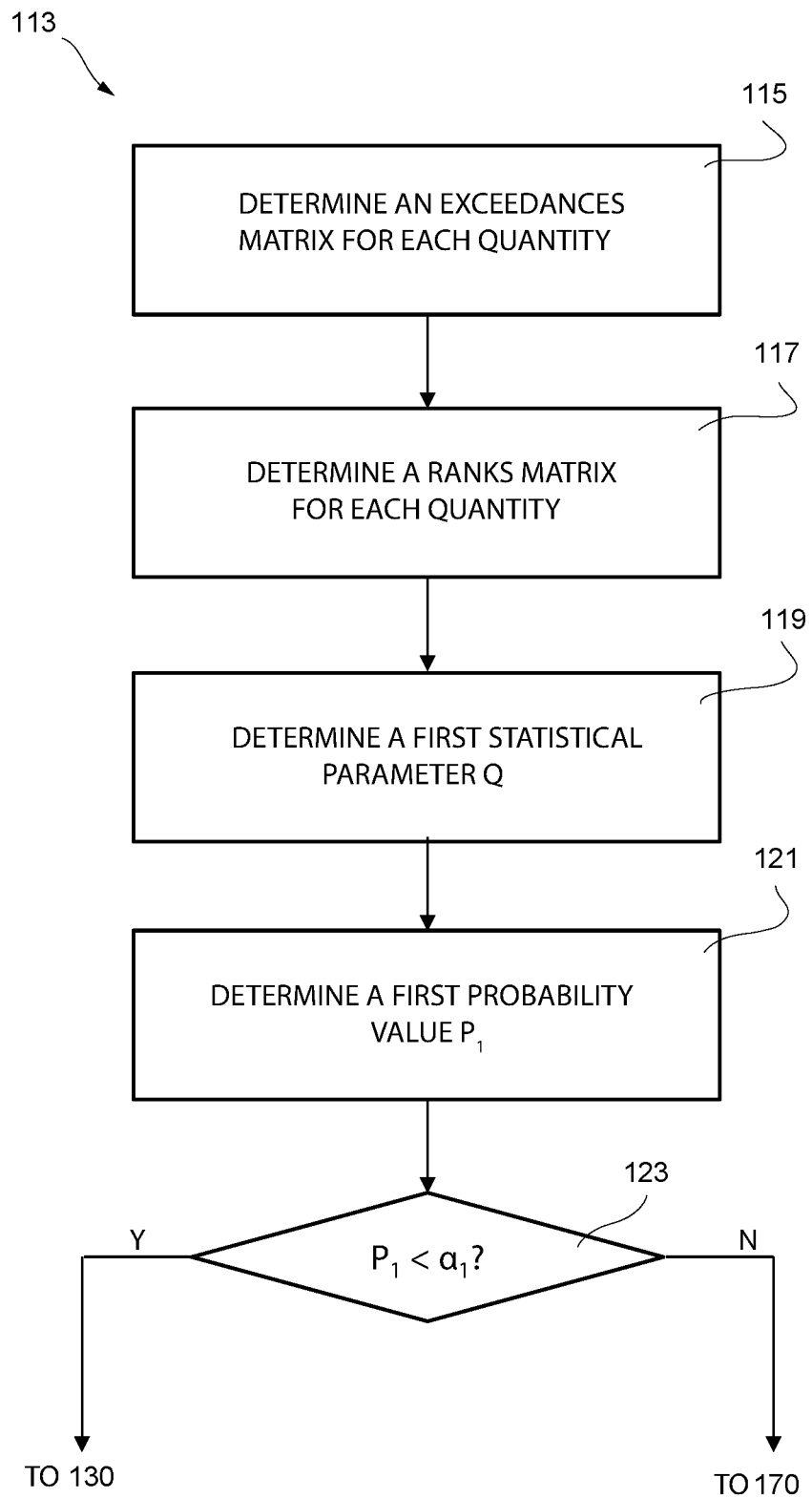
FIG. 5 shows in detail a flowchart of a step of the flowchart of FIG. 4.

In this embodiment, as shown in FIG. 5, step 113 comprises determining (step 115), by the computer 12, a plurality of exceedances matrices X of the k-th aircraft 3, starting from the data structure 10.

The exceedances matrices X are each associated with a respective primary quantity Pr.

Each exceedances matrix has a number N of rows, each corresponding to a level (or value) of the respective primary quantity Pr, and a number M of columns, each corresponding to a respective flight.

Each exceedances matrix X comprises a plurality of values of exceedance, or exceedances $x_{ij}$, each indicating the number of times the respective primary quantity Pr assumed (or exceeded) the value indicated by the i-th row, during the flight indicated by the j-th column.

In this embodiment, the flights indicated by the M columns all have the same duration.

By way of example only, it is considered that the data structure 10 comprises, for the k-th aircraft 3, a number F=9 of flights, for each of which the values of two primary quantities Pr, i.e. a primary quantity of load factor Nz and a primary quantity of roll speed $p$ have been acquired and stored.

FIG. 6 shows an exceedances matrix X1 associated with the primary quantity of load factor Nz of the k-th aircraft 3. The exceedances matrix X1 has a number N=26 rows, each corresponding to a specific level of the primary quantity of load factor Nz within the range (−4, 9), and a number M=9 of columns, corresponding to the number of flights F monitored for the k-th aircraft 3. Thereafter, each flight of the k-th aircraft 3 is referred to as the j-th flight $f_j$.

In the exceedances matrix X, the columns j=1, . . . , M, that is the flights of the k-th aircraft 3, have an initial sorting.

In the example of FIG. 6, the initial sorting is an ascending flight-number sorting. That is, column j=1 comprises the exceedances $x_{i1}$ of a first flight f1 (flight 1 in FIG. 6), column j=2 comprises the exceedances $x_{i2}$ of a second flight f2 (flight 2 in FIG. 6), and so on up to column j=9, which comprises the exceedances $x_{i9}$ of a ninth flight f9 (flight 9 in FIG. 6).

For example, the initial sorting is such that the columns of the exceedances matrix are ordered so that flights $f_1, \ldots, f_9$ are arranged in ascending occurrence chronological order.

However, the initial sorting of the columns may be different, e.g. the flights may be arranged in descending chronological order or in any other order.

For example, FIG. 6 indicates that the k-th aircraft 3 has reached the level equal to 2.5 of the load factor Nz once in the first flight $f_1$, twenty-one times in the second flight $f_2$, seven times in the fourth flight $f_4$ (flight 7 in FIG. 6), etc.

In particular, here, the exceedances $x_{ij}$ of each j-th flight $f_j$ refer to the same flight duration, e.g. of one hour.

Figure 7:
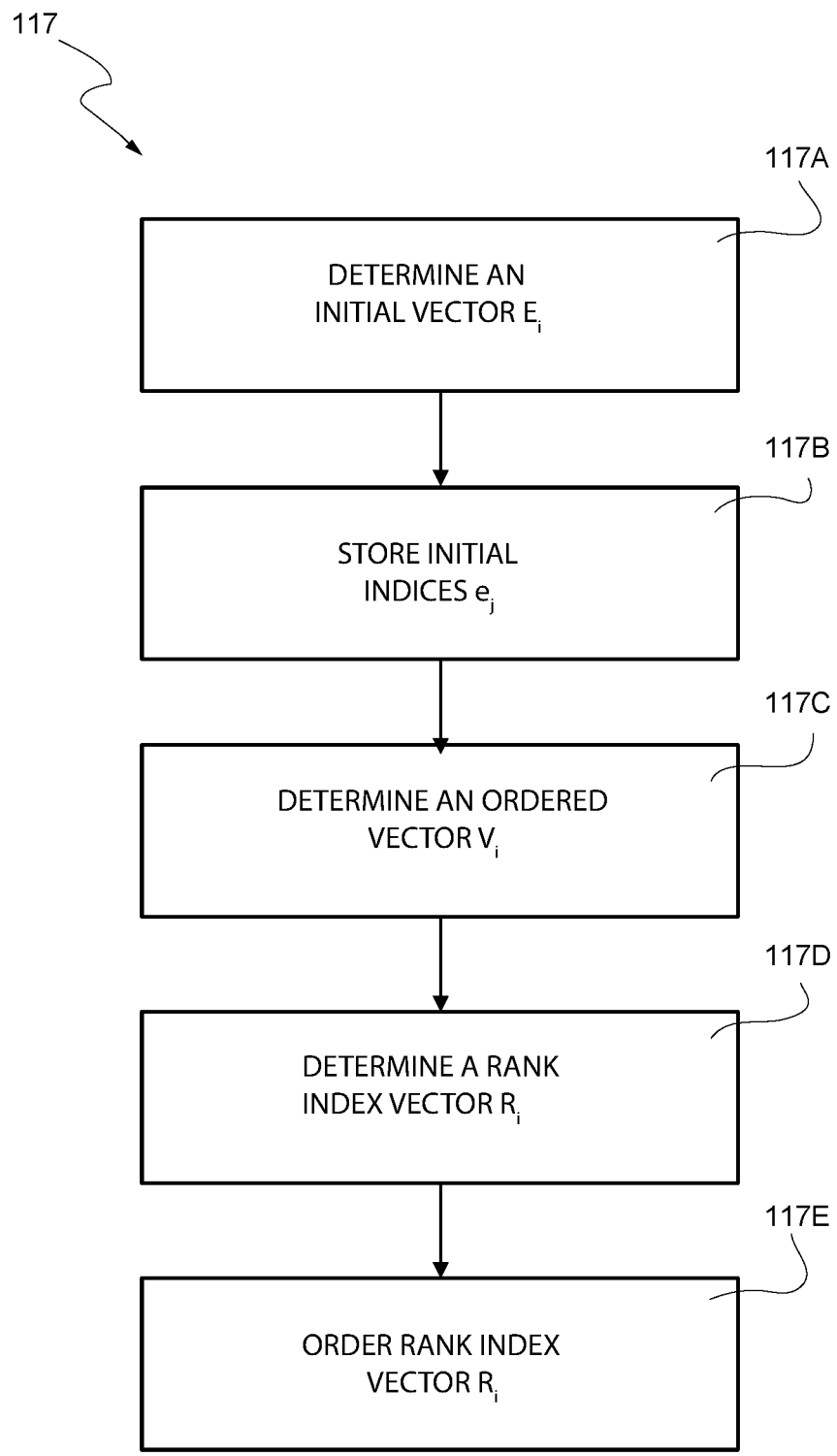
FIG. 7 shows in detail a flowchart of a step of the flowchart of FIG. 5.

Next, the computer 12 determines a ranks matrix R (step 117) starting from the exceedances matrix X, according to the method shown in FIG. 7.

The ranks matrix R has the same number N of rows and the same number M of columns as the exceedances matrix X, and comprises a plurality of ranks $r_{i,j}$.

In this embodiment, the computer 12 determines the i-th row of the ranks matrix R starting from the exceedance values $x_{ij}$ of the i-th row of the exceedances matrix X.

In detail, the computer 12 determines (step 117A) an initial vector $E_i$ formed by the exceedances $x_{ij}$ of the i-th row of the exceedances matrix X. In the initial vector $E_i$, the exceedances $x_{ij}$ are ordered according to the initial sorting and are each indicated by a respective initial index $e_j$, which is stored by the computer 12 (step 117B).

For example, with reference to the example of the exceedances matrix X1 of FIG. 6, FIG. 8 shows the initial vector $E_{13}$, which is relative to the row i=13 of the exceedances matrix X1, corresponding to the level of the primary quantity of load factor Nz=2.5. In the initial vector $E_{13}$, the first position, indicated by the first initial index $e_1$, is occupied by the exceedance value $x_{13.1}$ associated with the first flight $f_1$ and the ninth position, indicated by the ninth initial index $e_9$, is occupied by the exceedance value $x_{13.9}$ associated with the ninth flight $f_9$.

Next, the computer 12 determines (step 117C) an ordered vector Vi, which is formed by the exceedances values $x_{ij}$ of the initial vector $E_i$, arranged in ascending order. In the ordered vector $V_i$, the exceedances $x_{ij}$ are each arranged in a respective ordered position $v_j$. In this embodiment, equal values of the initial vector $E_i$ are arranged in the respective ordered vector $V_i$, respecting the initial sorting.

Following the example of FIG. 8, FIG. 9 shows the ordered vector $V_{13}$, obtained starting from the initial vector $E_{13}$, wherein the first ordered position $v_1$ is occupied by the exceedance $x_{13.1}$ associated with the first flight $f_1$, and having the first initial index $e_1$. In fact, the exceedance $x_{13.1}$ associated with the first flight $f_1$ has the lowest value, together with the exceedance $x_{13.3}$ associated with the third flight $f_3$, in the initial vector $E_{13}$.

For example, the ninth ordered position $v_9$ of the ordered vector $V_{13}$ is assigned to the exceedance $x_{13.2}$ associated with the second flight $f_2$, since the exceedance $X_{13.2}$ has the largest value in the initial vector $E_{13}$.

Then, step 117D, the computer 12 determines a vector of rank indices $R_i$, which is formed by a plurality of rank indices $r_j$, one for each flight $f_j$, each calculated starting from the ordered vector $V_i$.

Each rank index $r_j$ of the vector of rank indices $R_i$ is a function of the exceedances values $x_{ij}$, of the ordered vector $V_i$ and of the relative ordered positions $v_j$.

Figure 10:
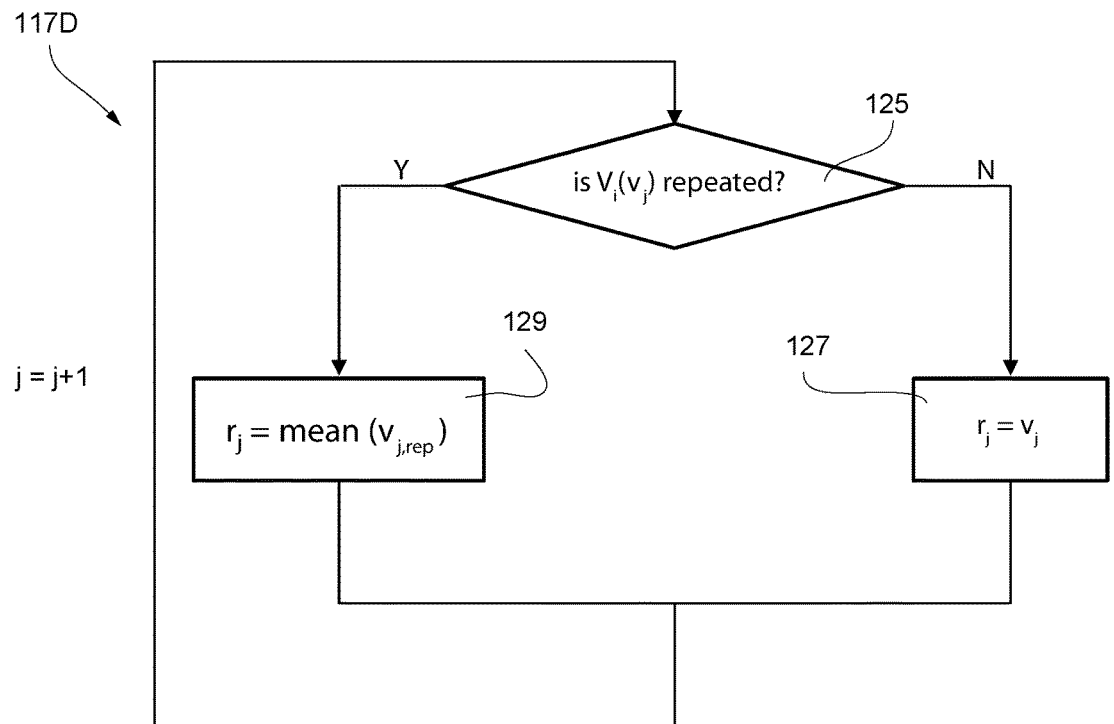
FIG. 10 shows in detail a flowchart of a step of the flowchart of FIG. 7.

In detail, as shown in FIG. 10, the computer 12 verifies (step 125) whether the exceedance value $V_i(v_j)$ stored in the ordered vector $V_i$ in the ordered position $v_j$ is repeated in the ordered vector $V_i$. In the negative case (output N from step 125), the rank index $r_j$ is set equal to the respective index of the ordered position $v_j$ (step 127).

For example, with reference to the example of FIG. 9, the value $V_{13}(v_9)=21$, associated with the second flight $f_2$, is unique in the vector $V_{13}$. Consequently, the ninth rank index $r_9$, associated with the second flight $f_2$, is equal to the ninth ordered position $v_9$; that is $r_9=9$.

If, on the contrary (output S from step 125), the exceedance value $V_i(v_j)$ stored in the ordered vector $V_i$ in the ordered position $v_j$ is equal to the exceedance value $V_i(\{v_{rep}\})$ stored in a plurality of repeated positions $\{v_{rep}\}$ in the ordered vector $V_i$, then the rank index $r_j$ is set equal to the arithmetic mean of all repeated positions $v_{rep}$ occupied by the exceedances $V_i(\{v_{rep}\})$ having the same value (step 129).

If the result of the arithmetic mean is not an integer number, the corresponding rank index $r_j$ can be assigned, for example, to the result of the arithmetic mean rounded to the nearest integer.

In practice, flights having the same exceedance value $x_{ij}$ have the same rank index $r_j$, which is given by the arithmetic mean of the ordered positions $v_j$ occupied by the exceedances of those flights in the ordered vector $V_i$.

The computer 12 thus repeats step 125 for each ordered position $v_j$ of the ordered vector $V_i$.

For example, with reference to the example of FIG. 9, the first and second rank indexes $r_1$, $r_2$ are equal to 1.5. In fact, as described above, the exceedances $V_{13}(v_1)$ and $V_{13}(v_2)$ associated with the first and second ordered position $v_1$, $v_2$ respectively have the same value. Thus, the first and second rank indexes r1, r2 are the same and equal to $(v_1+v_2)/2$; that is, equal to $(1+2)/2=1.5$.

For example, the exceedance values associated with the fourth flight $f_4$, the fifth flight $f_5$, the sixth flight $f_6$, the seventh flight $f_7$ and the eighth flight $f_8$ are identical to each other, equal to 7, and occupy the ordered positions from $v_4$ to $v_8$ in the ordered vector $V_{13}$. Consequently, the rank indices from $r_4$ to re are identical to each other and equal to $(v_4+v_5+v_6+v_7+v_8)/5$; that is equal to $(4+5+6+7+8)/5=6$.

Again with reference to FIG. 7, the computer 12 orders (step 117E) the vector of rank indices $R_i$ according to the initial sorting.

In detail, the rank index $r_j$ associated with the exceedance $V_i(v_j)$ is placed in the position indicated by the initial index $e_j$ associated with the exceedance $V_i(v_j)$.

In practice, the rank index $r_j$ associated with the f-th flight $f_f$ is arranged in the position initially occupied by the f-th flight $f_f$.

For example, the ninth rank index $r_9$ associated with the second flight $f_2$ is arranged in the second initial index $e_2$ initially occupied by the exceedance value $x_{13.2}$ associated with the second flight $f_2$, as visible in the ranks matrix R of FIG. 11 obtained starting from the exceedances matrix X1 of the example of FIG. 6.

The computer 12 performs step 117 for each i-th row of the exceedances matrix X, thus forming the ranks matrix R.

Again with reference to FIG. 5, after calculating the ranks matrix R, the computer 12 performs a statistical test to verify the null hypothesis that the flights F of the k-th aircraft 3 are homogeneous with each other.

In detail, the computer 12 determines (step 119) a first statistical parameter Q, which is given by the following formula:

$$\frac{12}{n \cdot m \cdot (m+1)} \sum_{j=1}^{m} r_j^2 - 3n \cdot (m+1), \text{ wherein } r_j^2 = \left(\sum_{i=1}^{N} r_{ij}\right)^2.$$

The parameter $r_j^2$ indicates a total rank of the j-th flight $f_j$. That is, the total rank $r^2_j$ of the j-th flight $f_j$ is given by the square of the sum of the ranks $r_{i,j}$ of all rows i=1, ..., N of the ranks matrix R of the j-th column.

The computer 12 determines (step 121) a first probability value $P_1$, indicative of the probability of obtaining the first statistical parameter Q.

The first probability value $P_1$ can be determined, in a known manner, by comparing the value of the first statistical parameter Q with a specific table ("look-up table"), e.g. stored in the computer 12.

In fact here, since the number N of rows is greater than or equal to 15 and the number M of columns is greater than or equal to 5, the probability distribution of the first statistical parameter Q is approximated by the probability distribution $X^2$ (chi-squared), with M−1 degrees of freedom.

Next, the computer 12 verifies (step 123) whether the first probability value $P_1$ is lower than a first significance level $\alpha_1$. The first significance level $\alpha_1$ is indicative of a desired first confidence level $cl_1$, and is given by the formula $\alpha 1=1-cl_1$.

The desired first confidence level $cl_1$ for example ranges between 95% and 99%, in particular it is equal to 95%.

If the first probability value $P_1$ is greater than the first significance level $\alpha_1$ (output N of step 123), then the zero hypothesis is verified.

In practice, the computer 12 verifies that the total ranks $r_j$ of the flights F have zero (or approximately zero) variance between them, according to the first confidence level $cl_1$.

In other words, the computer 12 verifies that all groups of data 13 (spectra) of the flights of the k-th aircraft 3, relating to the specific primary quantity Pr, are homogeneous with each other.

In general, therefore, all flights associated with the k-th aircraft 3 have mutually a low variability.

If the null hypothesis is verified, the computer 12 performs a step 170 of identification of the aircraft representative flights $F_{k,r}$, described below.

Conversely, if the first probability value $P_1$ is lower than the first significance level $\alpha_1$ (output S of step 123), then the null hypothesis is not verified.

In practice, there is at least one j-th flight among the flights associated with the k-th aircraft 3 which, for the specific primary quantity Pr analysed, e.g. for the primary quantity of load factor Nz in the example of FIG. 11, is not homogeneous with the other flights associated with the k-th aircraft 3.

Again with reference to FIG. 4, in the case where the null hypothesis is not verified, the computer 12 performs a step of identifying groups of homogeneous flights (step 130).

Figure 12:
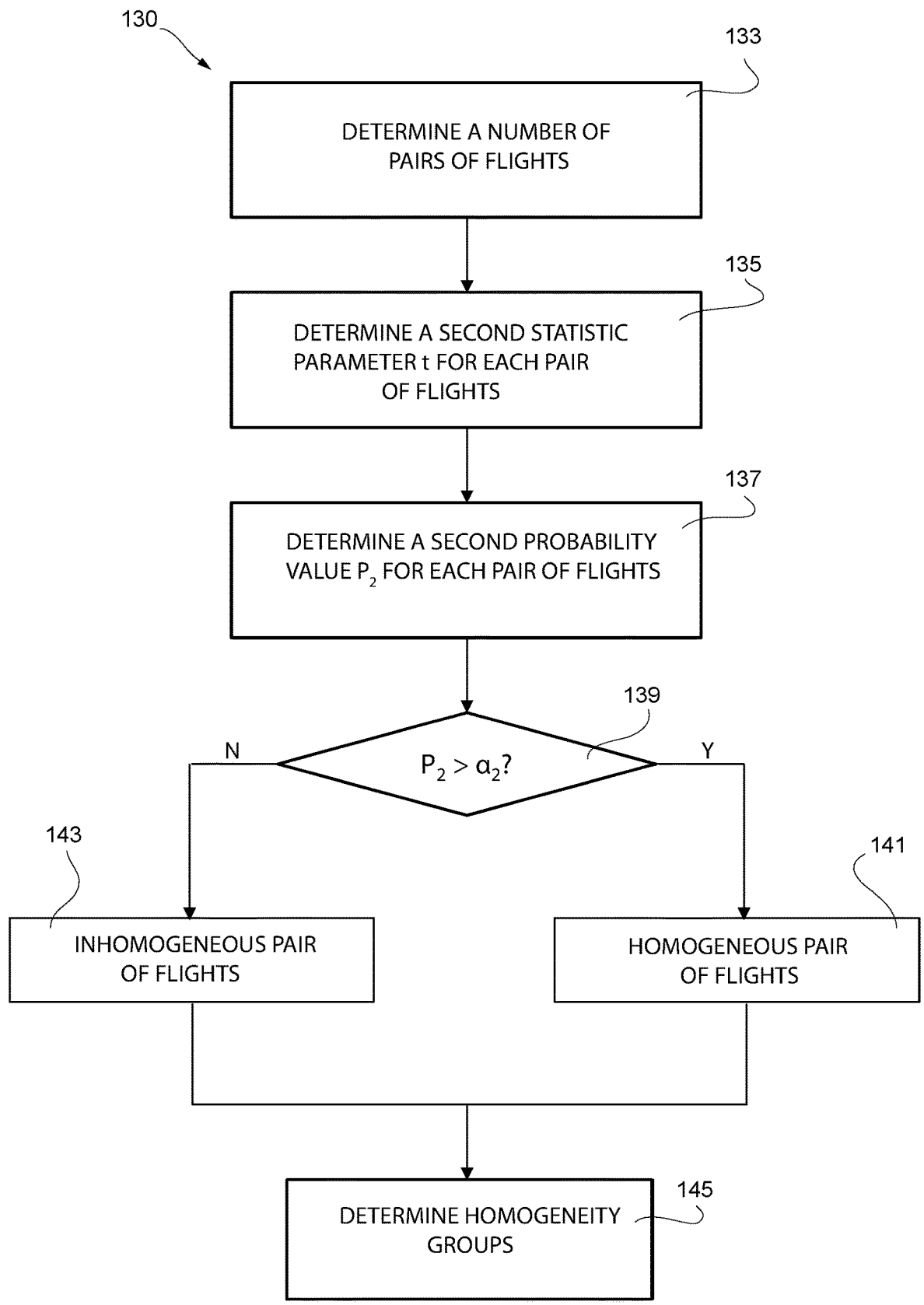
FIG. 12 shows in detail a flowchart of another step of the flowchart of FIG. 4.

As shown in FIG. 12, the step of identifying groups of homogeneous flights 130 comprises determining (step 133) a number FC of pairs of flights (A,B) given by all combinations of flights F, that is $FC=\sum_{j=1}^{M-1}(M-j)$.

In the example of FIG. 11, in which the number of flights is F=9, we have a number FC=36 of pairs of flights.

Each pair of flights (A,B) is formed by a first flight A and by a second flight B of the plurality of flights F of the k-th aircraft 3. The first flight A is associated with column $j_A$ of the ranks matrix R, the second flight B is associated with column $j_B$ of the ranks matrix R.

Next (step 135), for each pair of flights (A,B) and for each primary quantity Pr, the computer 12 determines a second statistical parameter $\underline{t}$, in order to verify a null hypothesis indicating that the first flight A and the second flight B are homogeneous with each other for the respective primary quantity Pr.

The computer 12 determines the second statistical parameter $\underline{t}$ starting from the difference, in modulus, between an average rank $r_A$ of the first flight A and an average rank $r_B$ of the second flight B according to the following formulae:

$$t = \frac{|r_A - r_B|}{SE}, r_A = \left(\frac{\sum_{i=1}^{N} r_{iA}}{N}\right), r_B = \left(\frac{\sum_{i=1}^{N} r_{iB}}{N}\right),$$

-continued $$SE = \frac{1}{N}\sqrt{\frac{2\left(N \cdot \sum_{i=1}^{N}\sum_{j=1}^{M} r_{ij}^2 - \sum_{j=1}^{M} r_{ij}^2\right)}{(N-1)\cdot(M-1)}}.$$

In practice, the average rank $r_A$ of the first flight A and the average rank $r_B$ of the second flight B are respectively the arithmetic mean of all ranks $r_{i,jA}$ (that is of the ranks $r_{i,j}$ of all rows N of column $j_A$ associated with the first flight A) and the arithmetic mean of all ranks $r_{i,jB}$ (that is of the ranks $r_{i,j}$ of all rows N of column $j_B$ associated with the second flight B). In addition, the parameter SE indicates the standard error, calculated starting from the ranks matrix R.

Subsequently, the computer 12 determines (step 137) a second probability value $P_2$ indicative of the probability of obtaining the above calculated value of the second statistical parameter $\underline{t}$. The second probability value $P_2$ can be determined, in a known manner, by comparing the value of the second statistical parameter t with a specific table ("look-up table"), e.g. stored in the computer 12.

The second statistical parameter $\underline{t}$ in fact follows the two-tailed probability distribution $\overline{t}$, with (N−1)·(M−1) degrees of freedom, where N and M are respectively the number of rows and the number of columns of the ranks matrix R.

Next, the computer 12 verifies (step 139) whether the second probability value $P_2$ is greater than a second significance level $\alpha_2$. The second significance level $\alpha_2$ is indicative of a desired second confidence level $cl_2$, and is given by the formula $\alpha_2=1-cl_2$.

The desired second confidence level $cl_2$ for example ranges between 95% and 99%, in particular it is equal to 95%.

According to one embodiment, the second significance level $\alpha_2$ can be modified using a correction factor CORR. In fact, since this test is performed on each pair of flights (A,B), the use of the correction factor CORR makes it possible to avoid an incorrect rejection of the null hypothesis when repeating the test on all pairs of flights (A,B).

In this embodiment, the correction factor CORR is equal to the number FC of pairs of flights (A,B).

The second significance level $\alpha_2$ can therefore be corrected using the formula $\alpha_2=\alpha_2/FC$.

If the second probability value $P_2$ is greater than the second significance level $\alpha_2$ (output S from step 139), then the pair of flights (A,B) is classified (step 141) as homogeneous for the specific primary quantity Pr.

In other words, for the specific primary quantity Pr, the variance between the values of the pair of flights (A,B) is zero (or approximately zero), according to the second confidence level $cl_2$.

Conversely, if the second probability value $P_2$ is lower than the second significance level $\alpha_2$ (output N from step 139), then the pair of flights (A,B) is classified (step 143) as inhomogeneous for the specific primary quantity Pr.

Starting from the table of the ranks matrix R of the example of FIG. 11, the computer 12 can obtain the table of FIG. 13, which shows the result of the analysis on all pairs of flights (A,B) described with reference to steps 133-143 of FIG. 12.

For example, the first flight $f_1$ and the third flight $f_3$ are homogeneous with each other; the second flight $f_2$ is not homogeneous with any other flight of the plurality of flights F; and the flights between the fourth flight $f_4$ and the ninth flight $f_9$ are homogeneous with each other.

Next, the computer 12 determines (step 145) a plurality of homogeneity groups G(Pr), each comprising the flights F of the pairs of flights (A,B) that are homogeneous with each other for the specific primary quantity Pr.

Specifically, in the example of FIG. 13, the computer 12 identifies three homogeneity groups G(Nz) for the load factor Nz, indicated as the first homogeneity group G1(Nz), second homogeneity group G2(Nz) and third homogeneity group G3 (Nz).

The first homogeneity group G1(Nz) comprises the first flight $f_1$ and the third flight $f_3$ and the second homogeneity group G2(Nz) comprises the flights included between the fourth flight $f_4$ and the ninth flight $f_9$.

The second flight $f_2$ is not homogeneous with any other flight with regard to the load factor Nz. In this embodiment, therefore, the third homogeneity group G3(Nz) comprises only the second flight $f_2$.

However, in general, a flight that is not homogeneous with any other flight of the plurality of flights F, for the specific primary quantity, may be considered as an outlier and therefore may be treated differently by the computer 12, as described below.

Next (FIG. 4), the computer 12 verifies (step 150) whether the number of homogeneity groups G(Pr) is lower than the number of flights F. In the negative case (output N from step 150), the number of homogeneity groups G(Pr) is equal to the number of flights F. In practice, there are no flights of the plurality of flights F that are homogeneous with each other for the specific primary quantity Pr.

In this embodiment, the computer 12 then performs a step 153 to identify the aircraft representative flights $F_{k,r}$. Step 153 will be described later, with reference to FIGS. 18-20.

Conversely, in the case where the number of homogeneity groups G(Pr) is lower than the number of flights F (output S from step 150), then there are flights of the plurality of flights F that are homogeneous with each other for the specific primary quantity Pr.

The computer 12 performs steps 113, 130 and 150 described above for each primary quantity Pr that has been acquired and stored in the data structure. That is, the computer 12 identifies, for each primary quantity Pr, a respective plurality of homogeneity groups G(Pr).

With reference to the example described above, in which the data structure 10 comprises, for the k-th aircraft 3, both samples relating to the primary quantity of load factor Nz and samples relating to the primary quantity of roll speed p, the computer 12 repeats steps 113, 130 and 150 described above also for the primary quantity of roll speed p.

For example, the computer 12 identifies three homogeneity groups G(p) for the primary quantity of roll speed p. In particular, the three homogeneity groups G(p) of roll speed p are formed by a first homogeneity group G1 (p) comprising the first and the second flight $f_1$, $f_2$; by a second homogeneity group G2 (p) comprising the third, the fifth, the seventh and the eighth flight $f_3$, $f_5$, $f_7$, $f_8$; and a third homogeneity group G3(p) comprising the fourth, the sixth and the ninth flight $f_4$, $f_6$, $f_9$.

The computer 12 proceeds to identify (step 160 of FIG. 4) groups of flights of the plurality of flights F which are homogeneous for all primary quantities $Pr_1, \ldots, Pr_L$; that is, here, for the primary quantity of load factor Nz and for the primary quantity of roll speed p.

In other words, the computer 12 identifies the flights that belong, for each primary quantity Pr, to the same homogeneity groups G(Pr).

In detail, the computer 12 forms a grouping matrix RM, whose rows are each associated with a homogeneity group G(Pr) of a respective primary quantity Pr, and whose columns are each associated with a respective flight F.

In particular, the grouping matrix RM may comprise, at position (i,j), the value '1' if the flight of the j-th column belongs to the homogeneity group G(Pr) of the i-th row. Vice versa, the grouping matrix RM may comprise, at position (i,j), the value '0' if the flight of the j-th column does not belong to the homogeneity group G(Pr) of the i-th row.

For example, FIG. 14 shows the grouping table RM of the flights F relating to the homogeneity groups G(Nz) of the load factor Nz and to the homogeneity groups G(p) of the roll speed p. For example, the elements of the first column, which corresponds to the first flight $f_1$, are equal to '1' for the rows corresponding to the first homogeneity group G1 (Nz) and to the first homogeneity group G1(p).

The computer 12 forms a plurality of overall homogeneous groups G(Pr1, . . . ,PrL), each comprising flights having, in each row, the same value.

From the table of FIG. 14, the computer 12 extracts five groups of overall homogeneous flights G(Nz,p), wherein a first group of overall homogeneous flights G1(Nz,p) comprises the first flight $f_1$; a second group of overall homogeneous flights G2(Nz,p) comprises the second flight $f_2$; a third group of overall homogeneous flights G3(Nz,p) comprises the third flight $f_3$; a fourth group of overall homogeneous flights G4(Nz,p) comprises the fourth, the sixth and the ninth flight $f_4$, $f_6$, $f_9$; and a fifth group of overall homogeneous flights G5(Nz,p) comprises the fifth, the seventh and the eighth flight $f_5$, $f_7$, $f_8$.

Again with reference to FIG. 4, the computer 12, after having verified the existence of a single homogeneity group comprising all flights of the k-th aircraft 3 (output S from step 113) or after having identified the overall homogeneous groups of flights G(Pr1, . . . ,PrL) (step 160), determines (step 170) the flights which, for each homogeneous group of aircraft Gi, represent from a statistical viewpoint the respective homogeneous group of aircraft Gi.

Figure 15:
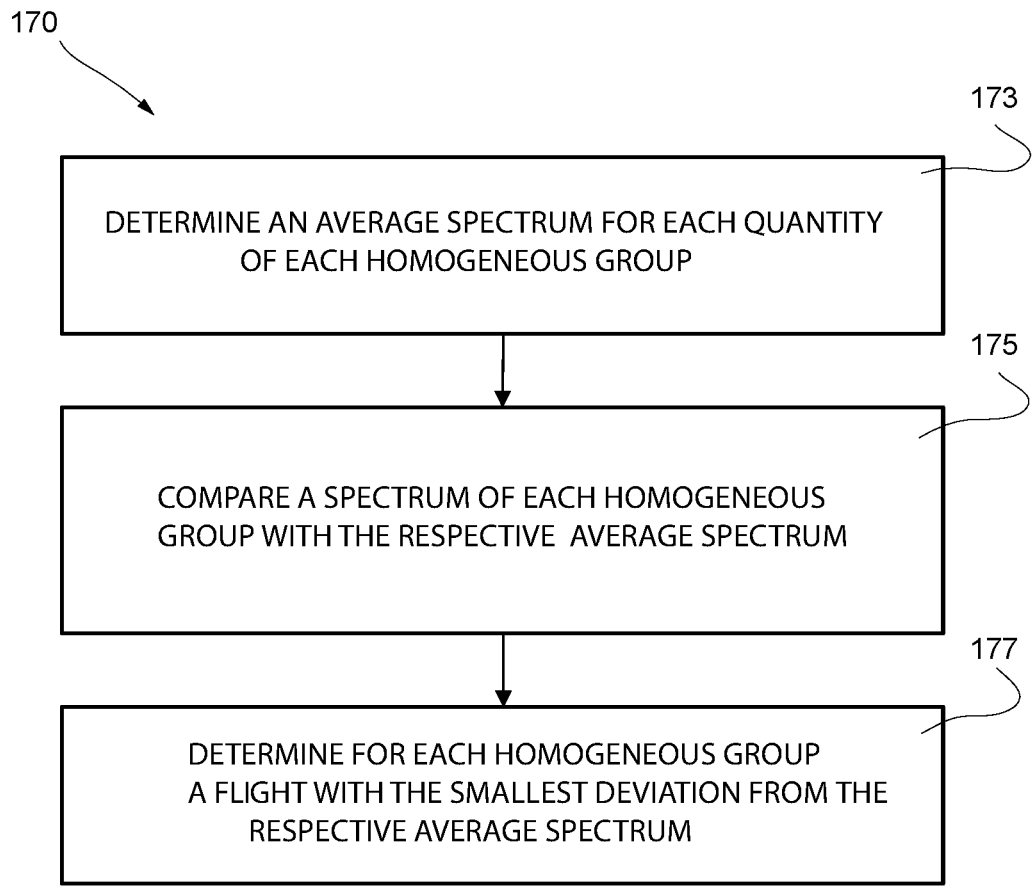
FIG. 15 shows in detail a flowchart of another step of the flowchart of FIG. 4.

In detail, as shown in FIG. 15, the computer 12 determines (step 173), for each primary quantity Pr and for each homogeneous group of aircraft Gi, that is for the single homogeneous group or for each of the overall homogeneous groups of flights G(Pr1, . . . ,PrL), a respective average spectrum $F_{Gi,Pr}(x_i)$. The average spectrum $F_{Gi,Pr}(x_i)$ is formed by a plurality of average values, wherein each i-th average value is given by the arithmetic mean of the i-th exceedance values $x_i$ of the respective primary quantity Pr of the flights belonging to the respective homogeneous group of aircraft Gi.

In this embodiment, the arithmetic mean is rounded down to the lower integer value.

Figure 16:
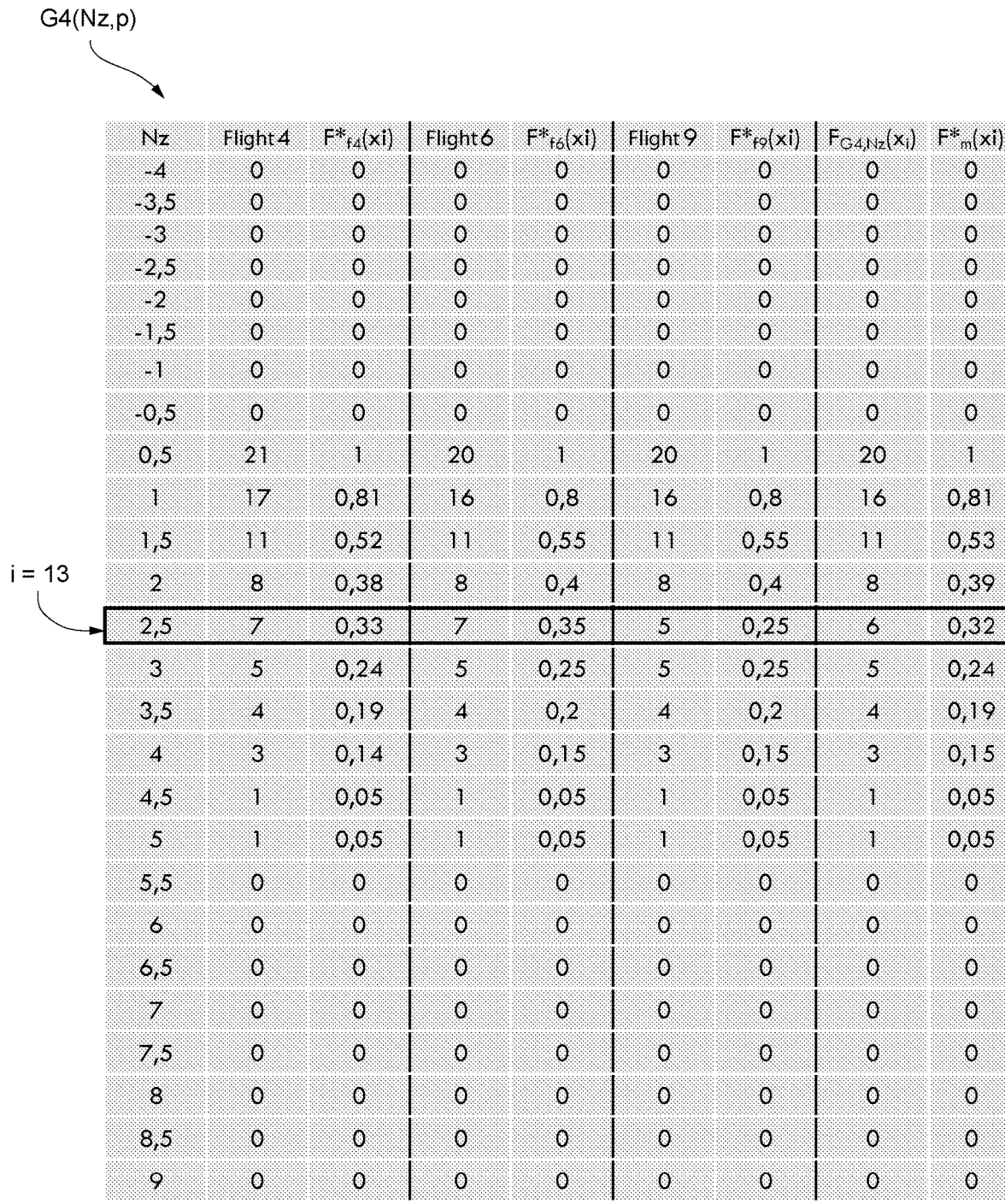
FIG. 16 shows a numerical example of application of the flowchart of FIG. 15.

For example, the table of FIG. 16 shows an example of the calculation of the average spectrum $F_{G4,Nz}(x_i)$, associated with the primary quantity of load factor Nz (FIG. 6) and with the fourth overall homogeneous group of flights G4 (Nz,p) (FIG. 14).

FIG. 16 shows an extract from the exceedances matrix X1 of FIG. 6, in which the exceedance values $x_{ij}$ of the fourth flight $f_4$, of the sixth flight $f_6$ and of the ninth flight $f_9$ are shown, and in which an additional column shows the respective average spectrum $F_{G4,Nz}(x_i)$.

As can be seen from FIG. 16, for example for row i=13 corresponding to level Nz=2.5, the fourth flight $f_4$ has an exceedances value equal to 7, the sixth flight $f_6$ has an exceedances value equal to 7 and the ninth flight $f_9$ has an exceedances value equal to 5. Consequently, the respective value of the average spectrum $F_{G4,Nz}(x_{13})$ is equal to (7+7+5)/3=6.

Then, step 175, the computer 12 determines the flight in the homogeneous group Gi, for each primary quantity Pr, which has the smallest deviation from the respective average spectrum $F_{Gi,Pr}(x_i)$.

In detail, the computer 12 determines, for each primary quantity Pr of each flight ff of a homogeneity group Gi, an empirical distribution function $F^*_{ff}(xi)$ given by the formula $F^*_{ff}(x_i)=x_i/N$, wherein N is the total number of exceedances of the flight ff, that is the number of exceedances associated with the lowest level of the respective primary quantity Gr that was exceeded during the respective flight ff.

Similarly, the computer 12 also determines an average empirical distribution function $F^*_m(x_i)$, starting from the average spectrum $F_{Gi,Pr}(x_i)$.

The table of FIG. 16 also shows the empirical distribution functions $F^*_{ff}(xi)$ for the fourth, sixth and ninth flight $f_4$, $f_6$, $f_9$ and for the average spectrum $F_{G4,Nz}(x_i)$, relative to the primary quantity of load factor Nz.

For example, for the fourth flight f4, the value of the empirical distribution function $F^*_{f4}(x_{13})$ for the value Nz=2.5 is equal to the respective exceedance value divided by the total number of exceedances, here corresponding to the number of exceedances of the lowest level of the primary quantity of load factor Nz that was exceeded during the respective flight, that is for the value Nz=0.5; that is 7/21=0.33.

Then, the computer 12, determines (step 177) the flights ff whose empirical distribution function $F^*_{ff}(xi)$ has a smaller deviation, or divergence, than the average empirical distribution function $F^*_m(x_i)$.

In detail, the computer 12 determines, for each flight ff, a divergence $D_{ff}(x_i)$ between each value $x_i$ of the respective empirical distribution function $F^*_{ff}(x_i)$ and the respective value $x_i$ of the average empirical distribution function $F_m(x_i)$. In practice, $D_{ff}(x_i)=F^*_{ff}(x_i)-F_m(x_i)$.

The computer 12 determines, for each flight ff, a maximum divergence $D_{m,ff}$, which is given by the divergence $D_{ff}(x_i)$ having, in absolute value, the maximum value; that is, $D_{m,ff}=\max|D_{ff}(x_i)|$.

In the example of FIG. 16, for the fourth flight $f_4$ we have $D_{m,f4}=2\cdot19\cdot10^{-2}$, for the sixth flight $f_6$ we have $D_{m,f6}=3.85\cdot10^{-2}$ and for the ninth flight $f_9$ we have $D_{m,f9}=6.15\cdot10^{-2}$.

The computer 12 identifies the flight ff having the lowest value of the maximum divergence $D_{m,ff}$ as representative flight $F_r$ of the respective homogeneity group, for the specific primary quantity Pr.

In particular, here, the computer 12 identifies the fourth flight $f_4$ as representative flight $F_r$ of the fourth group of overall homogeneous flights G4(Nz,p), for the primary quantity of load factor Nz.

The computer 12 repeats steps 173, 175, 177 on the fourth group of overall homogeneous flights G4(Nz,p) also for the primary quantity of roll speed p and identifies the respective representative flight, e.g. the ninth flight $f_9$.

The computer 12 then identifies the fourth flight $f_4$ for the primary quantity of load factor Nz and the ninth flight $f_9$ for the primary quantity of roll speed p, as representative flights $F_r$ of the fourth group of overall homogeneous flights G4 (Nz,p).

In general, by considering a generic group of overall homogeneous flights G ($Pr_1, \ldots, Pr_L$), the computer 12 identifies, as aircraft representative flights $F_{k,r}$, the flights of the generic group of overall homogeneous flights G ($Pr_1, \ldots, Pr_L$) that have been identified as representative flights $F_{k,r}$ for a larger number of primary quantities Pr.

The computer 12 performs what is described above with reference to step 110 for each k-th aircraft 3 of the fleet 1.

Accordingly, for each k-th aircraft 3, a plurality of aircraft representative flights $F_{k,r}$ are identified.

The values of the primary quantities that have been acquired and stored during the aircraft representative flights $F_{k,r}$ represent, from a statistical viewpoint, a typical use of the respective k-th aircraft 3.

Purely by way of example, FIG. 17 shows a table reporting the exceedances values of the load factor Nz of the aircraft representative flights $F_{k,r}$ for each k-th aircraft 3.

For the sake of simplicity, the table of FIG. 17 only shows an example of an aircraft representative flight $F_{1,1}$ for the first aircraft 3A having k=1, here equal to the fourth flight $f_4$ of FIG. 6, and an example of an aircraft representative flight $F_{2,1}$ for the second aircraft 3B having k=2.

In practice, the aircraft representative flights $F_{k,r}$ are arranged, by the computer 12, so as to form a fleet exceedances matrix Xf.

In other words, the fleet exceedances matrix Xf comprises the exceedances, for each primary quantity Pr and for each k-th aircraft 3, only of the aircraft representative flights $F_{k,r}$.

Figure 18:
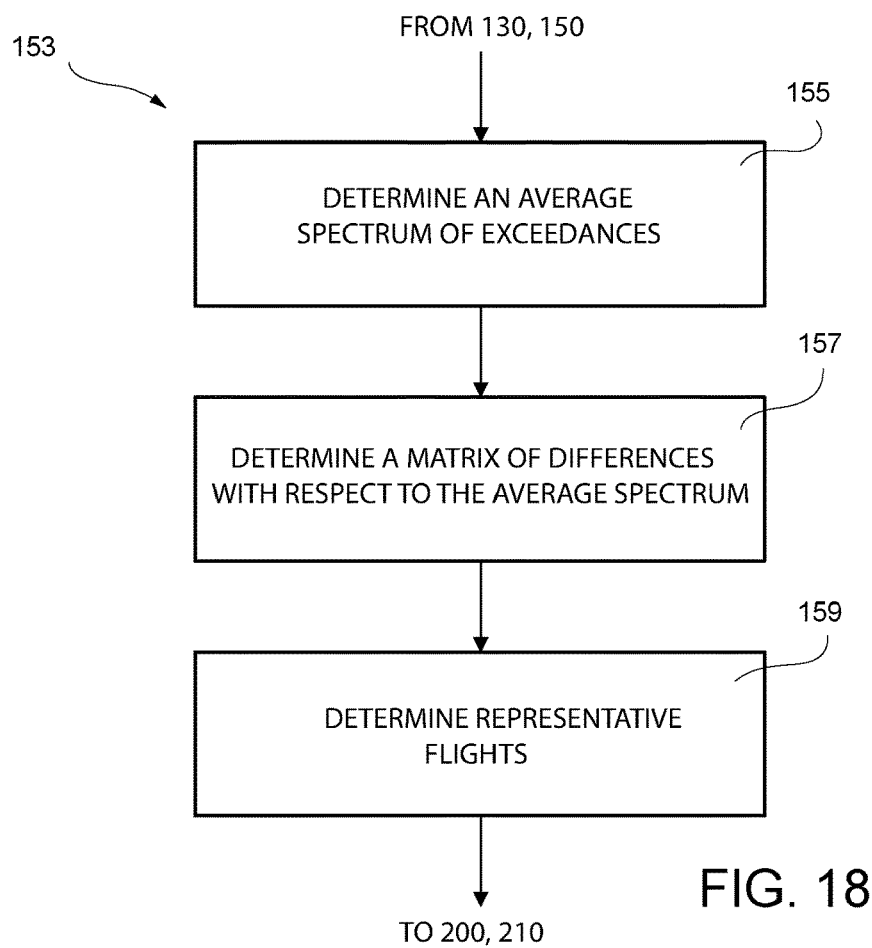
FIG. 18 shows in detail a flowchart of another step of FIG. 4.

Again with reference to FIG. 4, in the case where the computer 12 identifies a number of homogeneity groups equal to the number of flights F (output N from step 150); that is, in the case where there are no flights of the plurality of flights F that are homogeneous with each other, the computer 12 performs a step 153 of specific identification of aircraft representative flights $F_{k,r}$, as shown in detail in FIG. 18.

Figure 19:
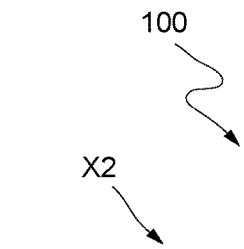

Purely by way of example, let us consider an exceedances matrix X2 of the primary quantity of load factor Nz shown of FIG. 19, which is related to a data structure similar to the data structure 10 of FIG. 3, here indicated by 100. The exceedances matrix X2 of FIG. 19 comprises, for the k-th aircraft 3, a first flight $f_1$, a second flight $f_2$ and a third flight $f_3$, which have been identified as non-homogeneous by the computer 12, in step 130, with respect to the remaining flights of the plurality of flights associated with the k-th aircraft 3.

The computer 12 determines (step 155) an average spectrum $S_M(x_i)$ of the load factor Nz, also shown in FIG. 19, starting from the exceedances matrix X2. The average spectrum $S_M(x_i)$ comprises, for each value of the load factor Nz corresponding to the i-th row, the arithmetic mean of the exceedances of the respective value of the load factor Nz corresponding to the i-th row associated with the first flight $f_1$, the second flight $f_2$ and the third flight $f_3$.

For example, as shown in the table of FIG. 19, $S_M(X_{13})=(X_{13,1}+X_{13,2}+X_{13,3})/3$.

In this embodiment, the values of the average spectrum $S_M(x_i)$ are rounded to the nearest integer.

Next, step 157, the computer 12 determines a difference matrix $\Delta$. The difference matrix $\Delta$ is given by the difference between the exceedances matrix X and the average spectrum $S_M$. In other words, each element $\delta_{i,j}$ of the difference matrix $\Delta$ is given by the difference between the element $x_{i,j}$ of the exceedances matrix X and the element $S_M(x_i)$ of the average spectrum $S_M$.

FIG. 20 shows the difference matrix $\Delta$ obtained starting from the exceedances matrix X2 of FIG. 19.

Next, step 159, the computer 12 identifies, for each level of the load factor Nz, the flight having the maximum difference $\delta_{i,j}$ from the average spectrum $S_M(x_i)$. For example, for the value of the load factor Nz of the row i=13, the first flight $f_1$ has the maximum difference with respect to the average value.

The computer 12 selects one or more aircraft representative flights $F_{k,r}$ on the basis of a choice condition, established at the design stage.

In this embodiment, both the first and the second flight $f_1$, $f_2$ are associated with a similar number of maximum difference values, while the third flight $f_3$ is not associated with any maximum difference value. Accordingly, the computer 12 selects both the first flight $f_1$ and the second flight $f_2$ as aircraft representative flights $F_{k,r}$.

However, the computer 12 can be configured to use different selection methods. For example, the selection condition may comprise selecting the flight associated with a number of difference maximum values greater than a threshold.

In the light of what is described above, and again with reference to FIG. 2, the computer 12, at the output from step 110, has identified one or more aircraft representative flights $F_{k,r}$ for each k-th aircraft.

Then, step 200, the computer 12 determines, starting from all aircraft representative flights $F_{k,r}$ of each k-th aircraft 3, a plurality of flights representing, from a statistical viewpoint, a typical use of all aircraft 3 of the fleet 1. These flights are hereinafter referred to as fleet representative flights $F_{f,r}$.

In detail, step 200 comprises performing the same steps described with reference to step 110 and shown in detail in FIGS. 4, 5, 7, 10, 12, 15 and 18. Consequently, these steps are indicated by the same reference numbers and are not further described.

In practice, the computer 200 determines a fleet exceedances matrix Xf (FIG. 17) for each primary quantity Pr and, starting from the fleet exceedances matrix Xf, determines the fleet representative flights $F_{f,r}$.

The fleet exceedances matrix Xf of each primary quantity Pr comprises the exceedance values of all aircraft representative flights $F_{k,r}$.

In a manner similar to that described for step 113, the computer 12 first verifies whether the aircraft representative flights $F_{k,r}$ are all homogeneous with each other, for each primary quantity Pr.

In the negative case, in a manner similar to that described for step 130, starting from the fleet exceedances matrix Xf of each primary quantity Pr, the computer 12 determines a plurality of fleet homogeneous groups GF(Pr), for each primary quantity Pr.

Next, in a manner similar to that described for step 160, starting from the fleet homogeneous groups GF(Pr), the computer 12 determines a plurality of fleet overall homogeneous groups GF(Pr1, . . . ,PrL). The fleet overall homogeneous groups GF(Pr1, . . . ,PrL) are also simply referred to hereafter as fleet homogeneous groups GF(Pr1, . . . ,PrL) or fleet homogeneity groups GF (Pr1, . . . , PrL).

Next, in a manner similar to that described for step 170, from the fleet homogeneous groups GF(Pr1, . . . ,PrN), the computer 12 identifies a plurality of fleet representative flights $F_{f,r}$.

For simplicity and by way of further example, let us consider that, in a data structure 200 similar to the data structure 10 of FIG. 3, the first number of flights F1 of the first aircraft 3A is equal to 5 and the second number of flights F2 of the second aircraft 3B is equal to 4. In addition, for both the first and second aircraft 3A, 3B the values of the primary quantities of load factor Nz and of roll speed p have been acquired and stored in use.

The computer 12, after performing steps 110 and 200 described above, has identified the following four fleet homogeneous groups GF(Nz,p):

first fleet homogeneity group $GF_1(Nz,p)$, which comprises the first flight $f_1$ of the first aircraft 3A, the first flight $f_1$ of the second aircraft 3B and the fourth flight $f_4$ of the second aircraft 3B, wherein the latter has been identified as the first fleet representative flight $F_{f,1}$;

second fleet homogeneity group $GF_2(Nz,p)$, which comprises the third flight $f_3$ of the second aircraft 3B and the second flight $f_2$ of the first aircraft 3A, wherein the latter has been identified as the second fleet representative flight $F_{f,2}$;

third fleet homogeneity group $GF_3(Nz,p)$, which comprises the fourth flight $f_4$ of the first aircraft 3A, which has been identified as the third fleet representative flight $F_{f,3}$; and fourth fleet homogeneity group $GF_4(Nz,p)$, which comprises the second flight $f_2$ of the second aircraft 3B, which has been identified as the fourth fleet representative flight $F_{f,4}$.

In addition, the data structure 200 also comprises the following durations, in hours h, of the number F1 of flights of the first aircraft 3A: 0.85 h for the first flight $f_1$, 0.78 h for the second flight $f_2$, 1.02 h for the third flight $f_3$, 0.60 h for the fourth flight $f_4$, and 0.90 h for the fifth flight $f_3$.

In addition, the data structure 200 comprises the following durations, in hours h, of the number F2 of flights of the second aircraft 3B: 0.87 h for the first flight $f_1$, 0.58 h for the second flight $f_2$, 0.72 h for the third flight $f_3$, 1.10 h for the fourth flight $f_4$.

Figure 21:
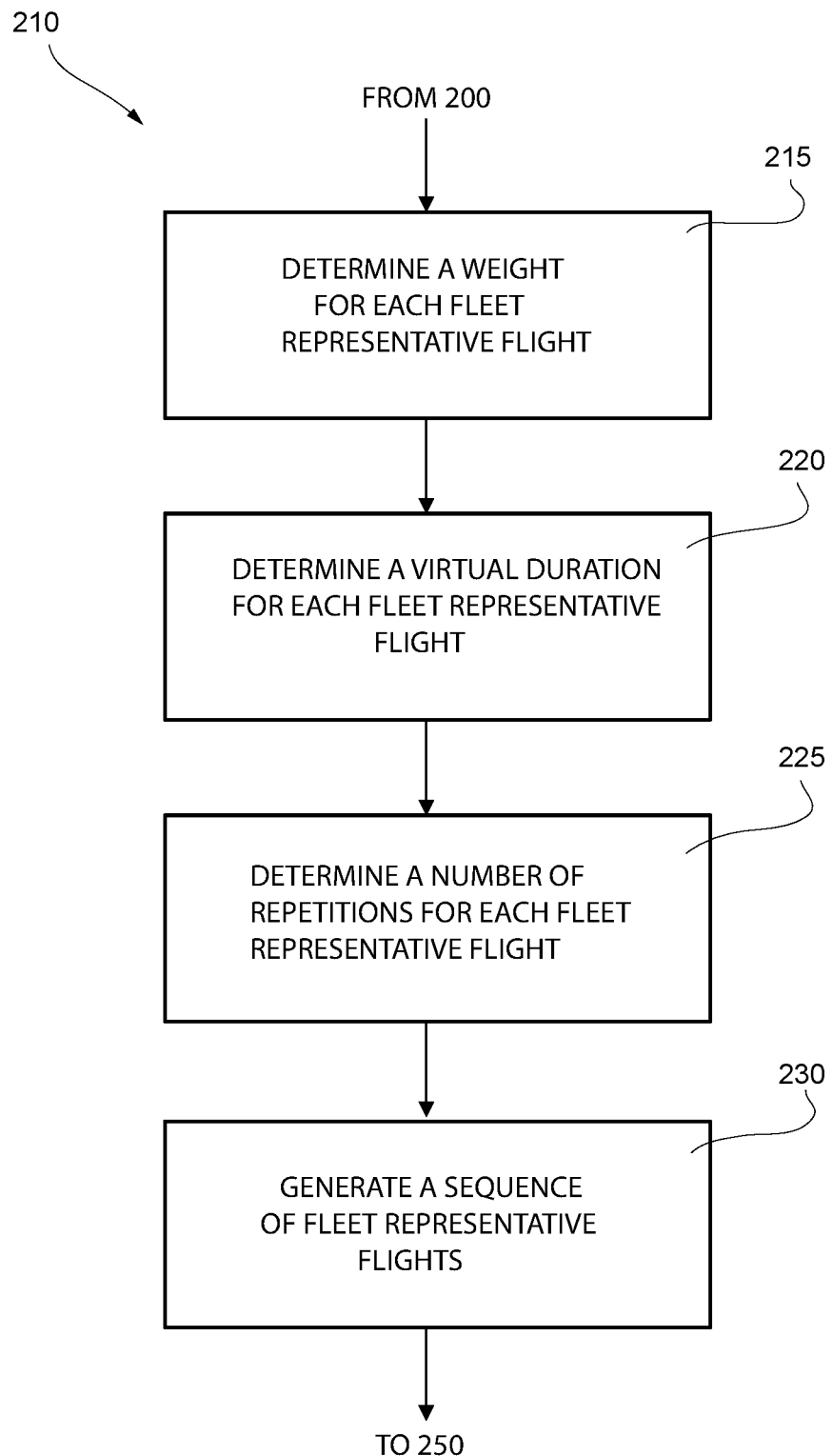
FIG. 21 shows in detail a flowchart of another step of the flowchart of FIG. 2.

As shown in FIG. 21, after step 200 in which the computer 12 identifies the fleet representative flights $F_{f,r}$, the computer 12 determines (step 210) a typical load history of the fleet 1.

In detail, the computer 12 determines (step 215) a plurality of use weights $UW_i$, one for each fleet representative flight $F_{f,r}$.

In even more detail, the computer 12 determines an overall flight time TOT_FH, which is given by the sum of the durations of the number F1, F2 of flights of the first and of the second aircraft 3A, 3B. In this example, the overall flight time TOT_FH is equal to 7.42 h.

In addition, the computer 12 determines a plurality of group flight times $GR\_FH_i$, one for each fleet homogeneity group $G_i(Nz,p)$.

The group flight time $GR\_FH_i$ of a fleet homogeneity group $GF_i(Nz,p)$ is given by the sum of the flight time of the flights belonging to the fleet homogeneity group $GF_i(Nz,p)$.

In the example considered, we have $GR\_FH_1=2.82$ h for the first fleet homogeneity group $GF_1(Nz,p)$, $GR\_FH_2=2.4$ h for the second fleet homogeneity group $GF_2(Nz,p)$, $GR\_FH_3=1.62$ h for the third fleet homogeneity group $GF_3(Nz,p)$, and $GR\_FH_4=0.58$ h for the fourth fleet homogeneity group $GF_4(Nz,p)$.

The use weight $UW_i$ of a fleet representative flight $F_{f,r}$ is given by the ratio between the group flight time $GR\_FH_i$ of the fleet homogeneity group $GF_i(Nz,p)$ that it represents and the total flight time TOT_FH. In practice, $UW_i=GR\_FH_i/TOT\_FH$.

In particular, in the example considered it is obtained $UW_1=38\%$ for the first fleet representative flight $F_{f,1}$, $UW_2=32\%$ for the second fleet representative flight $F_{f,2}$, $UW3=22\%$ for the third fleet representative flight $F_{f,3}$ and $UW_4=8\%$ for the fourth fleet representative flight $F_{f,4}$.

Subsequently, the computer 12 determines (step 220) a plurality of virtual flight times $V\_FH_i$, one for each fleet representative flight $F_{f,r}$, wherein $V\_FH_i=UW_i \cdot REF\_FH$, wherein REF_FH indicates a reference flight time.

The reference flight time REF_FH, e.g. comprised between 500 and 1000, is selected at the design stage of the present method depending on the specific application and can be stored in the computer 12.

The computer 12 determines (step 225) a number of repetitions $N\_F_i$ for each fleet representative flight $F_{f,r}$ as the ratio between the virtual flight time $V\_FH_i$ and the real flight time $R\_FH_i$ of the respective fleet representative flight $F_{f,ri}$. In practice, $N\_F_i = V\_FH_i/R\_FH_i$.

In this embodiment, if the ratio $V\_FH_i/R\_FH_i$ is not an integer number, the ratio is rounded up to the next integer.

In this way, it is possible to overestimate the number of repetitions and thus maintain a conservative approach, thereby increasing the level of safety provided by the present method.

Next, step 230, the computer 12 defines a sequence of analysis spectra, or analysis sequence, starting from each fleet representative flight $F_{f,r}$, and from the respective number of repetitions $N\_F_i$.

In detail, the computer 12 generates, for each fleet representative flight $F_{f,r}$, a number of copies of the acquired values of the primary quantities that are associated with the fleet representative flight, equal to the respective number of repetitions $N\_F_i$.

Figures 22, 23:
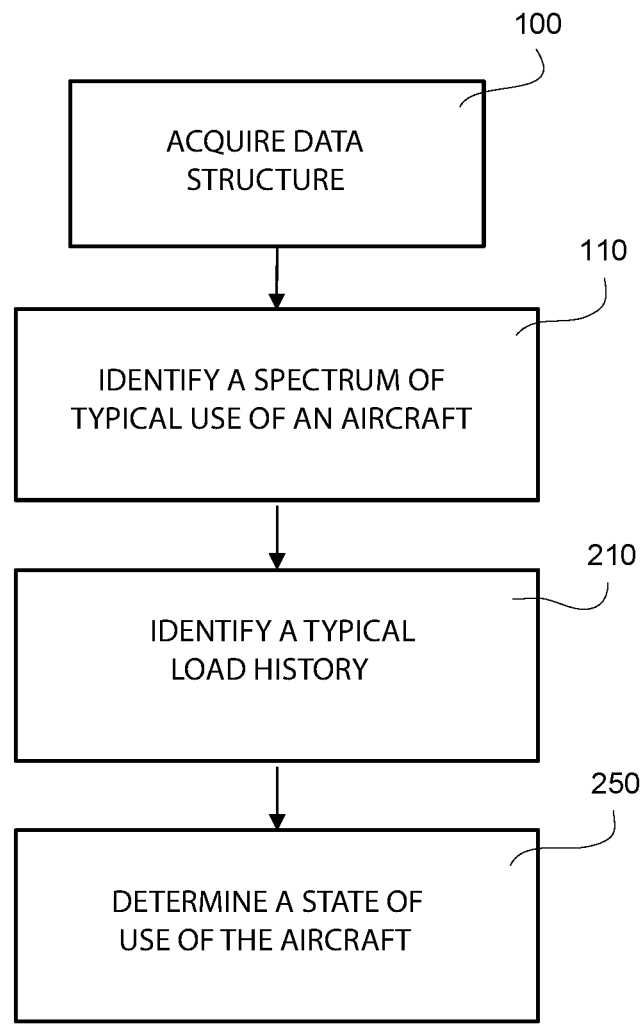
FIG. 22 shows a simplified diagram of an analysis sequence that can be obtained using the flowchart of FIG. 21.
FIG. 23 shows a flowchart of the present method, according to a different embodiment.

FIG. 22 qualitatively shows an example of an analysis sequence 300 comprising three fleet representative flights $F_{f,1}$, $F_{f,2}$, $F_{f,3}$, each of which is repeated a number $N\_F_1$, $N\_F_2$, $N\_F_3$, respectively.

In other words, the analysis sequence 300 is formed by the spectra 13 of the fleet representative flights $F_{f,1}$, $F_{f,2}$, $F_{f,3}$, wherein the spectra 13 are repeated a number of times equal to the respective number of repetitions $N\_F_i$, $N\_F_2$, $N\_F_3$.

Furthermore, in this embodiment, the computer 12 orders the analysis sequence 300 so that the copies of the spectra 13 of the fleet representative flights $F_{f,r}$ have a random sorting.

The analysis sequence forms a typical load history of the fleet 1, also indicated hereinafter as load sequence. In fact, it comprises the acquired values of the primary quantities Pr that represent, from a statistical viewpoint, a typical use of the aircraft 3 of the fleet 1.

In practice, the computer 12 generates the load sequence, wherein the load sequence comprises the acquired values of the primary quantities Pr (i.e. the spectra 13) that are associated to each representative flight; said values are repeated in the load sequence for a number of times that is a function of the duration of the respective representative flight.

The computer 12 subsequently determines (step 250) a state of use of the aircraft 3 of the fleet 1, starting from the analysis sequence.

Starting from the values of the primary quantities stored in the analysis sequence, it is in fact possible to obtain a set of stress values to which the aircraft 3 of the fleet 1 are typically subjected.

In detail, in this embodiment, the computer 12 performs a structural defect propagation analysis of the aircraft 3 of the fleet 1, starting from the data stored in the analysis sequence.

The structural defect propagation analysis is based on one or more known algorithms of simulation of propagation of defects in mechanical structures, e.g. it can be performed via NASGRO® software jointly developed by the Southwest Research Institute® (SwRI®) and the National Aeronautics and Space Administration (NASA).

In detail, the computer 12 derives a plurality of fleet stress values, starting from the load sequence.

Subsequently, in order to simulate the propagation of an initial structural defect of one of the aircraft 3 of the fleet 1, it provides as input to said one or more algorithms, as initial conditions, both the fleet stress values and the structural details of the specific aircraft 3 that is analysed, such as, for example, materials and characteristics of the initial structural defects and of the geometries of the analysed structure section.

The advantages that the present method allows to obtain emerge clearly from the previous description.

In fact, the present method allows the structural defect propagation analysis of each aircraft 3 of the fleet 1 to be performed, using fleet stress values, which are derived from the actual use of all aircraft 3 of the fleet 1.

In detail, the defect propagation analysis is based on the values of the primary quantities that are most representative, from a statistical viewpoint, of the use of the aircraft 3 of the entire fleet 1.

These representative values can then be reliably used to estimate the fatigue state and thus the residual fatigue life of the components of each aircraft of the fleet.

The corresponding structural defect propagation analysis is able to produce a highly accurate result of the fatigue state and thus of the residual fatigue life of the components of each aircraft of the fleet. Consequently, such representative values can be used to optimise the maintenance operations of a fleet of aircraft while meeting safety requirements.

In practice, according to the present method, the group of aircraft may comprise an aircraft having an initial structural defect. In this case, the step of determining the state of use of the group of aircraft comprises performing a simulation of propagation of the initial structural defect of the aircraft, by using the load sequence.

The maintenance operations of the group of aircraft, for example the intervals of inspection of the aircrafts, may be determined, in a per se known way, depending on the specific application, starting from a result of said simulation of propagation of the initial structural defect.

Finally, it is clear that changes may be made to the method and system described and shown herein without, departing from the scope of the present invention, as defined in the annexed claims.

For example, the computer 12 can be configured to perform the operations described with reference to steps 110 and 200, which lead to the identification of aircraft representative flights $F_{k,r}$ and fleet representative flights $F_{f,r}$ respectively, using statistical tests of a different type.

For example, non-parametric statistical tests of a different type may be used, such as the Kruskal-Wallis test for the statistical test of FIG. 5, or the Dunnett test, the Student-Newman-Keuls (SNK) test or the Nemenyi test for the statistical test of FIG. 12.

In addition, the present method may provide for the use of parametric statistical tests to identify homogeneous flights, e.g. the two-factor ANOVA test if the data distributions can be traced back to normal distributions.

For example, the present method can only be applied to a single aircraft and not to an entire fleet. In this case, as shown in FIG. 23, the present method, indicated here by 400, step 100, in which the aircraft representative flights are identified, is followed directly by step 210 of identifying the typical aircraft load history. In other words, the method 400 does not comprise step 200, in which the fleet representative flights are identified.

For example, anomalous flights, that is flights that are not homogeneous with any other flight, which were identified in step 130 (FIG. 4), both at single aircraft level and at fleet level, can be discarded. That is, such anomalous flights are considered neither as aircraft nor fleet representative flights for the subsequent determination of the typical load history (step 210).

According to another embodiment, anomalous flights that are not homogeneous with any other flight of the plurality of flights for a specific primary quantity can be analysed using steps 155, 157, 159 described with reference to FIG. 18.

According to one embodiment, if groups of overall homogeneous flights G(Pr1, . . . ,PrL) comprising only one flight are identified in step 160, said flight may be considered as an anomalous flight and therefore discarded.

According to another embodiment, such groups of overall homogeneous flights G(Pr1, . . . ,PrL) comprising only one flight can be selected using steps 155, 157, 159 described with reference to FIG. 18.

For example, the various embodiments described above may be combined to generate further solutions.

The invention claimed is:

1. A method implemented through a computer for determining a maintenance plan of a group of aircraft, the method comprising:
  receiving a data structure including a plurality of groups of values associated with a plurality of flights of the group of aircraft, each flight having a respective duration, wherein each group of values relates to a respective physical quantity associated with the use of a respective aircraft of the group of aircraft, and wherein each group of values is acquired during a respective flight by a detection system coupled to a respective aircraft of the group of aircraft;
  identifying one or more representative flights from the plurality of flights, starting from the data structure and using at least one statistical test, wherein the groups of values associated with the one or more representative flights are, from a statistical viewpoint, values of typical use of the group of aircraft;
  determining a load sequence comprising the groups of values associated with the one or more representative flights, said groups of values each being repeated, in the load sequence, for a respective number of times, as a function of the duration of the respective representative flight; and
  determining a state of use of the group of aircraft, starting from the load sequence,
  wherein identifying one or more representative flights comprises:
    determining at least one statistically homogeneous group of flights in the plurality of flights, the groups of values of the flights belonging to a same statistically homogeneous group of flights having, for a same physical quantity, a variability that is approximately zero, according to a confidence level; and
    determining, for each statistically homogeneous group of flights, a plurality of average distributions, one for each physical quantity, each average distribution being calculated starting from the groups of values relating to the same physical quantity and associated with the flights belonging to the same statistically homogeneous group of flights; and
    determining, for each statistically homogeneous group of flights, the flight of the respective statistically homogeneous group of flights having a minimum deviation with the respective average distribution, said flight being a representative flight of the respective statistically homogeneous group of flights.

2. The method according to claim 1, wherein the group of aircraft comprises an aircraft having an initial structural defect, and wherein determining a state of use of the group of aircraft comprises determining a state of use of said aircraft by performing a simulation of propagation of the initial structural defect of said aircraft, by using the load sequence.

3. The method according to claim 2, wherein performing a simulation of propagation of the initial structural defect of an aircraft of the group of aircraft comprises: deriving a plurality of stress values from the group of values of the load sequence, and provide said values of stress and structural details of said aircraft as input to an algorithm of simulation of propagation of structural defects.

4. The method according to claim 2, further comprising determining a maintenance plan of the group of aircraft based on a result of the simulation of propagation of the initial structural defect.

5. The method according to claim 1, wherein the at least one statistical test used to identify the one or more representative flights is a non-parametric statistical test.

6. The method according to claim 1, wherein the group of aircraft comprises a plurality of aircraft and wherein identifying one or more representative flights between the plurality of flights comprises:
  identifying, for each aircraft of the group of aircraft, at least one respective aircraft representative flight, starting from the groups of values associated with a respective plurality of flights, the respective plurality of flights being formed by the flights of the respective aircraft; and
  identifying at least one fleet representative flight, starting from the groups of values associated with a respective plurality of flights, the respective plurality of flights being formed by the at least one aircraft representative flight of each aircraft.

7. The method according to claim 1, wherein identifying at least one statistically homogeneous group of flights comprises:
  forming an exceedances matrix of a respective physical quantity starting from the group of values relating to the respective physical quantity, the matrix having a plurality of rows, one for each level of the physical quantity, and a plurality of columns, one for each flight of the plurality of flights;
  forming a ranks matrix, starting from the exceedances matrix, each row of the ranks matrix being determined starting from a respective row of the exceedances matrix, wherein forming a ranks matrix comprises, for each row, forming an ordered vector of exceedances, the rank associated with a flight, for each row, being a function of the position of the respective exceedance in the ordered vector of exceedances; and
  performing a statistical test on the ranks matrix, the statistical test being configured to identify at least one group of flights of the plurality of flights whose ranks mutually have a variance that is approximately zero according to a confidence level, the at least one group of flights forming a respective homogeneous group for the respective physical quantity.

8. The method according to claim 7, wherein performing a statistical test on the ranks matrix comprises:
  performing a first statistical test to verify, starting from the ranks matrix, whether the variance between the ranks of all the flights of the plurality of flights is approximately zero according to a first confidence level; and
  if the variance between the ranks of all the flights of the plurality of flights is not approximately zero according to the first confidence level for a respective physical quantity, forming a plurality of subsets of flights and performing a second statistical test on each subset of flights, for the respective physical quantity, to verify whether the variance between the ranks of the flights belonging to the subset of flights is approximately zero according to a second confidence level; and if the variance between the ranks of the flights belonging to the subset of flights is approximately zero according to the second confidence level, forming a corresponding homogeneity subgroup comprising the subset of flights; and forming at least one homogeneous group for the respective physical quantity, comprising flights that share a same homogeneity subgroup.

9. The method according to claim 7, comprising determining at least one homogeneous group for each physical quantity, wherein identifying at least one statistically homogeneous group of flights comprises determining the flights that belong, for each physical quantity, to the same homogeneous group.

10. The method according to claim 1, wherein the plurality of flights has a total flight duration, the at least one statistically homogeneous group of flights has a respective partial flight duration, and the representative flight of the at least one statistically homogeneous group of flights has a respective representative duration, wherein determining a load sequence comprises:

determining a use weight of the representative flight, the use weight being a function of the ratio between the partial flight duration and the total flight duration;

determining a virtual flight duration, wherein the virtual flight duration is proportional to the use weight;

determining a repetition factor of the representative flight, the repetition factor being a function of the ratio between the virtual flight duration and the representative duration, the groups of values of the representative flight of the at least one statistically homogeneous group of flights being repeated in the load sequence for a number of times equal to the respective repetition factor.

11. The method according to claim 1, wherein the plurality of flights comprises a number of anomalous flights, wherein the groups of values relating to a respective physical quantity of the number of anomalous flights are statistically non-homogeneous with respect to the groups of values relating to the respective physical quantity of the remaining flights of the plurality of flights, the method comprising:

determining an average spectrum of the respective physical quantity for each anomalous flight, starting from the respective group of values;

determining a spectrum of differences for each anomalous flight, the spectrum of differences of an anomalous flight being a function of the difference between the average spectrum and the group of values of the respective anomalous flight; and identifying one or more representative flights from the number of anomalous flights, as a function of the respective spectra of differences.

12. A processing system comprising means configured to carry out the method according to claim 1.

13. A non-transitory computer-readable medium storing instructions that, when executed by a computer, cause the method according to claim 1 to be carried out.

* * * * *